United States Patent
Schowengerdt et al.

(10) Patent No.: US 11,774,765 B2
(45) Date of Patent: Oct. 3, 2023

(54) METHOD AND SYSTEM FOR DUAL PROJECTOR WAVEGUIDE DISPLAYS WITH WIDE FIELD OF VIEW

(71) Applicant: Magic Leap, Inc., Plantation, FL (US)

(72) Inventors: Brian T. Schowengerdt, Seattle, WA (US); Mathew D. Watson, Bellevue, WA (US); Brandon Michael-James Born, Sunnyvale, CA (US); Samarth Bhargava, Saratoga, CA (US); Victor Kai Liu, Mountain View, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/070,144

(22) Filed: Nov. 28, 2022

(65) Prior Publication Data
US 2023/0096079 A1 Mar. 30, 2023

Related U.S. Application Data

(63) Continuation of application No. 17/327,570, filed on May 21, 2021, now Pat. No. 11,536,972.
(Continued)

(51) Int. Cl.
  *G02B 27/01* (2006.01)
  *G02B 27/00* (2006.01)
  *F21V 8/00* (2006.01)
(52) U.S. Cl.
  CPC ....... *G02B 27/0172* (2013.01); *G02B 6/0015* (2013.01); *G02B 6/0038* (2013.01);
(Continued)

(58) Field of Classification Search
  CPC ............ G02B 27/0172; G02B 27/0081; G02B 6/0015; G02B 6/0038; G02B 6/00;
(Continued)

(56) References Cited

U.S. PATENT DOCUMENTS

| 8,160,411 B2 | 4/2012 | Levola et al. |
| 10,267,970 B2 * | 4/2019 | Jones, Jr. ................. G02C 5/16 |

(Continued)

FOREIGN PATENT DOCUMENTS

| JP | 2020523634 A | 8/2020 |
| JP | 2021001955 A | 1/2021 |

(Continued)

OTHER PUBLICATIONS

U.S. Appl. No. 17/327,570 , "Notice of Allowance", dated Sep. 8, 2022, 12 pages.
(Continued)

*Primary Examiner* — Andrew Jordan
(74) *Attorney, Agent, or Firm* — KILPATRICK TOWNSEND & STOCKTON LLP

(57) ABSTRACT

A method of operating an eyepiece waveguide having a first region and a second region includes directing light from a first projector to impinge on a first incoupling grating (ICG) and light from a second projector to impinge on a second ICG. Light from the first projector is diffracted into a first portion and a second portion of the first region of the eyepiece waveguide and out of the eyepiece waveguide. Light from the second projector is diffracted into a first portion and a second portion of the second region of the eyepiece waveguide and out of the eyepiece waveguide.

17 Claims, 23 Drawing Sheets

Related U.S. Application Data

(60) Provisional application No. 63/029,312, filed on May 22, 2020.

(52) U.S. Cl.
CPC .. *G02B 27/0081* (2013.01); *G02B 2027/0125* (2013.01); *G02B 2027/0178* (2013.01)

(58) Field of Classification Search
CPC .... G02B 2027/0125; G02B 2027/0178; G02B 2027/0174
See application file for complete search history.

(56) References Cited

U.S. PATENT DOCUMENTS

| | | | | |
|---|---|---|---|---|
| 10,444,419 | B2* | 10/2019 | Bhargava | G02B 5/1823 |
| 10,481,317 | B2* | 11/2019 | Peroz | G02B 5/1866 |
| 10,627,559 | B2* | 4/2020 | Curtis | G06F 3/011 |
| 10,725,223 | B2* | 7/2020 | Schowengerdt | G06F 3/011 |
| 10,823,894 | B2* | 11/2020 | Peroz | G02B 6/0076 |
| 10,852,547 | B2* | 12/2020 | Bhargava | G02B 27/0944 |
| 10,983,263 | B2* | 4/2021 | Kleinman | G02B 5/1823 |
| 11,086,059 | B2* | 8/2021 | Schultz | G02B 27/4272 |
| 11,237,393 | B2* | 2/2022 | Bhargava | G02B 27/0172 |
| 11,238,836 | B2* | 2/2022 | Mathur | G09G 5/391 |
| 11,347,063 | B2* | 5/2022 | Bhargava | G02B 27/0955 |
| 11,402,636 | B2* | 8/2022 | Schowengerdt | G02B 27/0081 |
| 11,428,859 | B2* | 8/2022 | Curtis | G02C 11/10 |
| 11,536,972 | B2* | 12/2022 | Schowengerdt | G02B 6/0015 |
| 11,604,310 | B2* | 3/2023 | Schowengerdt | G02B 6/005 |
| 2010/0231693 | A1 | 9/2010 | Levola et al. | |
| 2015/0178939 | A1 | 6/2015 | Bradski et al. | |
| 2015/0235440 | A1 | 8/2015 | Schowengerdt | |
| 2016/0077338 | A1 | 3/2016 | Robbins et al. | |
| 2017/0139210 | A1 | 5/2017 | Vallius | |
| 2017/0315346 | A1 | 11/2017 | Tervo et al. | |
| 2018/0052276 | A1* | 2/2018 | Klienman | G06F 3/013 |
| 2018/0052277 | A1* | 2/2018 | Schowengerdt | G02B 5/1871 |
| 2018/0052320 | A1* | 2/2018 | Curtis | G02B 27/0172 |
| 2018/0052501 | A1* | 2/2018 | Jones, Jr. | G02B 27/0176 |
| 2018/0059297 | A1* | 3/2018 | Peroz | H04N 9/3164 |
| 2018/0059304 | A1* | 3/2018 | Bhargava | G02B 27/1086 |
| 2018/0172995 | A1 | 6/2018 | Lee et al. | |
| 2018/0182173 | A1 | 6/2018 | Robaina et al. | |
| 2018/0210205 | A1 | 7/2018 | Grey et al. | |
| 2018/0231771 | A1 | 8/2018 | Schuck, III et al. | |
| 2018/0275410 | A1* | 9/2018 | Yeoh | G06F 3/013 |
| 2018/0275415 | A1 | 9/2018 | Schowengerdt et al. | |
| 2018/0299678 | A1 | 10/2018 | Singer et al. | |
| 2019/0187474 | A1* | 6/2019 | Bhargava | G02B 27/0081 |
| 2019/0287495 | A1* | 9/2019 | Mathur | G06T 5/002 |
| 2020/0004021 | A1 | 1/2020 | Schowengerdt et al. | |
| 2020/0041712 | A1* | 2/2020 | Peroz | H05K 7/20963 |
| 2020/0158942 | A1 | 5/2020 | Yang et al. | |
| 2020/0158944 | A1 | 5/2020 | Wang et al. | |
| 2020/0159023 | A1* | 5/2020 | Bhargava | G02B 27/4272 |
| 2020/0209459 | A1* | 7/2020 | Curtis | G02B 6/005 |
| 2020/0209630 | A1* | 7/2020 | Schultz | G02B 27/4272 |
| 2020/0225491 | A1 | 7/2020 | Tekolste et al. | |
| 2020/0249491 | A1 | 8/2020 | Popovich et al. | |
| 2020/0264378 | A1* | 8/2020 | Grant | G02B 6/34 |
| 2020/0284967 | A1* | 9/2020 | Schowengerdt | G02B 27/0081 |
| 2020/0400955 | A1* | 12/2020 | Messer | G02B 5/1866 |
| 2021/0011305 | A1* | 1/2021 | Chang | G02B 27/0081 |
| 2021/0041704 | A1* | 2/2021 | Bhargava | G02B 27/0955 |
| 2021/0364803 | A1* | 11/2021 | Schowengerdt | G02B 27/0081 |
| 2021/0405299 | A1* | 12/2021 | Grant | G02B 27/0103 |
| 2022/0050232 | A1* | 2/2022 | Schultz | G02B 27/0081 |
| 2022/0137417 | A1* | 5/2022 | Bhargava | G02B 27/283 345/630 |
| 2022/0148538 | A1* | 5/2022 | Mathur | G06F 15/00 |
| 2022/0206207 | A1 | 6/2022 | Minemura | |
| 2022/0214503 | A1* | 7/2022 | Waldern | G02B 6/34 |
| 2022/0357581 | A1* | 11/2022 | Bhargava | G02B 27/0944 |
| 2022/0381969 | A1* | 12/2022 | Curtis | G02B 27/0018 |
| 2023/0096079 | A1* | 3/2023 | Schowengerdt | G02B 27/0081 385/37 |
| 2023/0129889 | A1* | 4/2023 | Schowendgerdt | H04N 9/3102 359/566 |

FOREIGN PATENT DOCUMENTS

| | | |
|---|---|---|
| WO | 2018136892 A1 | 7/2018 |
| WO | 2020106824 A1 | 5/2020 |

OTHER PUBLICATIONS

Application No. PCT/US2021/033768, "International Preliminary Report on Patentability", dated Dec. 1, 2022, 9 pages.

Application No. PCT/US2021/033768, "International Search Report and Written Opinion", dated Aug. 31, 2021, 10 pages.

Japanese Application No. 2021-527173, "Office Action" and English translation, dated Jul. 3, 2023, 14 pages.

* cited by examiner

METHOD AND SYSTEM FOR DUAL PROJECTOR WAVEGUIDE DISPLAYS WITH WIDE FIELD OF VIEW

This application is a continuation of U.S. patent application Ser. No. 17/327,570, filed May 21, 2021, entitled "METHOD AND SYSTEM FOR DUAL PROJECTOR WAVEGUIDE DISPLAYS WITH WIDE FIELD OF VIEW USING A COMBINED PUPIL EXPANDER-EXTRACTOR (CPE)," which is a non-provisional of and claims the benefit of and priority to U.S. Provisional Patent Application No. 63/029,312, filed May 22, 2020, entitled "METHOD AND SYSTEM FOR DUAL PROJECTOR WAVEGUIDE DISPLAYS WITH WIDE FIELD OF VIEW," the disclosures of which are hereby incorporated by reference in their entirety for all purposes.

BACKGROUND OF THE INVENTION

Modern computing and display technologies have facilitated the development of systems for so called "virtual reality" or "augmented reality" experiences, wherein digitally reproduced images or portions thereof are presented to a viewer in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the viewer.

Despite the progress made in these display technologies, there is a need in the art for improved methods and systems related to augmented reality systems, particularly, display systems.

SUMMARY OF THE INVENTION

The present invention relates generally to methods and systems related to projection display systems including wearable displays. More particularly, embodiments of the present invention provide methods and systems that provide an extended field of view in comparison with conventional systems. The invention is applicable to a variety of applications in computer vision and image display systems.

As described herein, the field of view of an eyepiece waveguide, also referred to as an eyepiece, is increased with respect to conventional designs by using multiple projectors to create sub-displays that form a combined field of view.

According to an embodiment of the present invention, an eyepiece waveguide for an augmented reality display system is provided. The eyepiece waveguide includes a substrate having a first surface and a second surface. The eyepiece waveguide also includes a diffractive input coupling element formed on or in the first surface or the second surface of the substrate. The diffractive input coupling element is configured to receive an input beam of light and to couple the input beam of light into the substrate as a guided beam. The eyepiece waveguide further includes a diffractive combined pupil expander-extractor (CPE) element formed on or in the first surface or the second surface of the substrate. The diffractive CPE element includes a first portion and a second portion divided by an axis. A first set of diffractive optical elements is disposed in the first portion and oriented at a positive angle with respect to the axis and a second set of diffractive optical elements is disposed in the second portion and oriented at a negative angle with respect to the axis.

According to another embodiment of the present invention, an eyepiece waveguide for an augmented reality display system is provided. The eyepiece waveguide includes a substrate having a first surface and a second surface. The eyepiece waveguide also includes a first diffractive input coupling element formed on or in the first surface or the second surface of the substrate. The first diffractive input coupling element is configured to receive a first input beam of light and to couple the first input beam of light into the substrate as a first guided beam. The eyepiece waveguide further includes a second diffractive input coupling element formed on or in the first surface or the second surface of the substrate. The second diffractive input coupling element is configured to receive a second input beam of light and to couple the second input beam of light into the substrate as a second guided beam.

Additionally, the eyepiece waveguide includes a diffractive combined pupil expander-extractor (CPE) element formed on or in the first surface or the second surface of the substrate. The diffractive CPE element is positioned to receive the first guided beam from the first diffractive input coupling element, receive the second guided beam from the second diffractive input coupling element, outcouple at least a portion of the first guided beam over a first range of angles to form a first field of view of a combined field of view, and outcouple at least a portion of the second guided beam over a second range of angles to form a second field of view of the combined field of view.

According to a specific embodiment of the present invention, a waveguide display disposed in glasses is provided. The waveguide display includes a first projector, a second projector, a first incoupling grating (ICG) optically coupled to the first projector, and a second ICG optically coupled to the second projector. An axis passes through the first ICG and the second ICG. The waveguide display also includes a first diffractive region optically coupled to the first ICG and including a first portion comprising a first set of gratings oriented at a positive angle with respect to the axis and a second portion comprising a second set of gratings oriented at a negative angle with respect to the axis. The waveguide display further includes a second diffractive region optically coupled to the second ICG and including a first portion comprising a third set of gratings oriented at 180° minus the positive angle with respect to the axis and a second portion comprising a fourth set of gratings oriented at −180° minus the negative angle with respect to the axis.

The first display light from the first projector can impinge on the first ICG at a non-zero angle of incidence. In some embodiments, the first ICG is characterized by a grating period such that a cone of rays incoupled by the first ICG is centered on the axis passing through the first ICG and the second ICG. The second ICG can be characterized by the grating period. In an embodiment, the first set of gratings and the second set of gratings are blazed and characterized by decreased outcoupling efficiency for light from the first projector. In another embodiment, the third set of gratings and the fourth set of gratings are blazed and characterized by decreased outcoupling efficiency for light from the second projector.

According to a particular embodiment of the present invention, a method of operating an eyepiece waveguide defined by a first region and a second region is provided. The method includes directing light from a first projector to impinge on a first incoupling grating (ICG). The method also includes diffracting a fraction of the light from the first projector into a first portion of the first region of the eyepiece waveguide, into a first portion of the second region, into a second portion of the second region, and out of the eyepiece waveguide. The method further includes diffracting another fraction of the light from the first projector into a second portion of the first region of the eyepiece waveguide, into a second portion of the second region, into the first portion of the second region, and out of the eyepiece waveguide. Additionally, the method includes directing light from a second projector to impinge on a second ICG. The method also includes diffracting a fraction of the light from the second projector into the first portion of the second region of the eyepiece waveguide, into the first portion of the first region, into the second portion of the first region, and out of the eyepiece waveguide. The method further includes diffracting another fraction of the light from the second projector into the second portion of the second region of the eyepiece waveguide, into the second portion of the first region, into the first portion of the first region, and out of the eyepiece waveguide.

The first region can include a first set of diffractive optical elements disposed in the first portion of the first region and oriented at a positive angle with respect to an axis and a second set of diffractive optical elements disposed in the second portion of the first region and oriented at a negative angle with respect to the axis. The second region can include a third set of diffractive optical elements disposed in the first portion of the second region and oriented at 180° plus the negative angle with respect to the axis and a fourth set of diffractive optical elements disposed in the second portion of the second region and oriented at 180° minus the positive angle with respect to the axis. In an embodiment, the first set of diffractive optical elements comprises a first set of gratings and the second set of diffractive optical elements comprises a second set of gratings. The first set of gratings and the second set of gratings can be blazed and characterized by decreased outcoupling efficiency for light from the first projector. The third set of diffractive optical elements can include a third set of gratings and the fourth set of diffractive optical elements can include a fourth set of gratings. The third set of gratings and the fourth set of gratings can be blazed and characterized by decreased outcoupling efficiency for light from the second projector. In a specific embodiment, the positive angle is ~30° and the negative angle is ~−30°. The first region and the second region can form an overlap region and the overlap region can be disposed at a midpoint between the first ICG and the second ICG. In some embodiments, the light from the first projector impinges on the first ICG at a first non-zero angle of incidence and the light from the second projector impinges on the second ICG at a second non-zero angle of incidence equal to zero minus the first non-zero angle of incidence. In an embodiment, a first field of view of the first portion of the second region is centered at the first non-zero angle of incidence and a second field of view of the first portion of the first region is centered at the second non-zero angle of incidence.

Numerous benefits are achieved by way of the present invention over conventional techniques. For example, embodiments of the present invention provide methods and systems that can be used to increase the field of view of a display and improve the user experience. In an embodiment, the grating period is selected to produce individual fields of view that are tiled or partially overlap to produce a combined field of view. These and other embodiments of the invention along with many of its advantages and features are described in more detail in conjunction with the text below and attached figures.

DETAILED DESCRIPTION OF SPECIFIC EMBODIMENTS

The present invention relates generally to methods and systems related to projection display systems including wearable displays. More particularly, embodiments of the present invention provide methods and systems that have an extended field of view in comparison with conventional systems. The invention is applicable to a variety of applications in computer vision and image display systems and light field projection systems, including stereoscopic systems, systems that deliver beamlets of light to the retina of the user, or the like.

Figure 1:
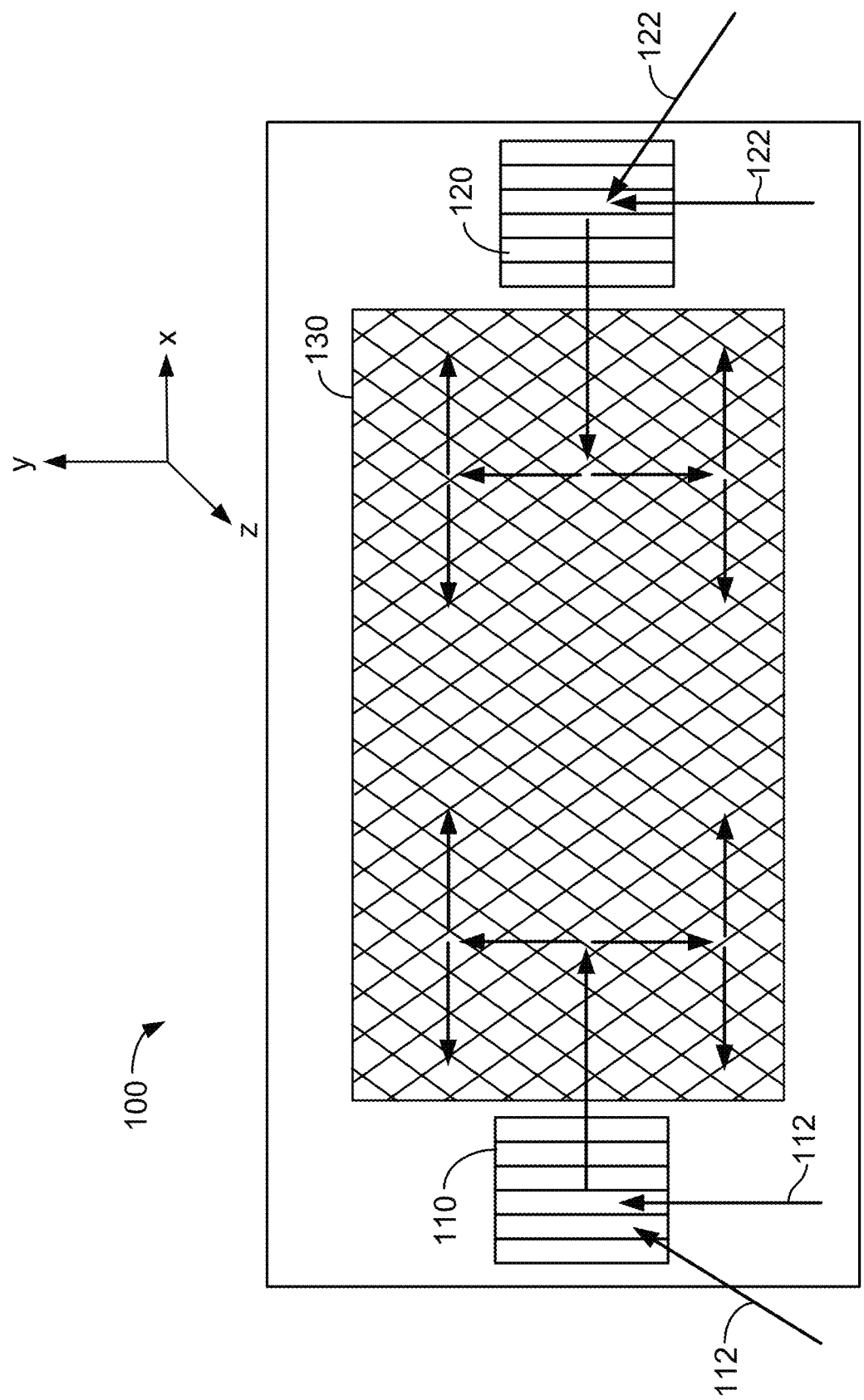
FIG. 1 is a simplified plan view diagram illustrating an eyepiece waveguide according to an embodiment of the present invention.
Figure 2A:
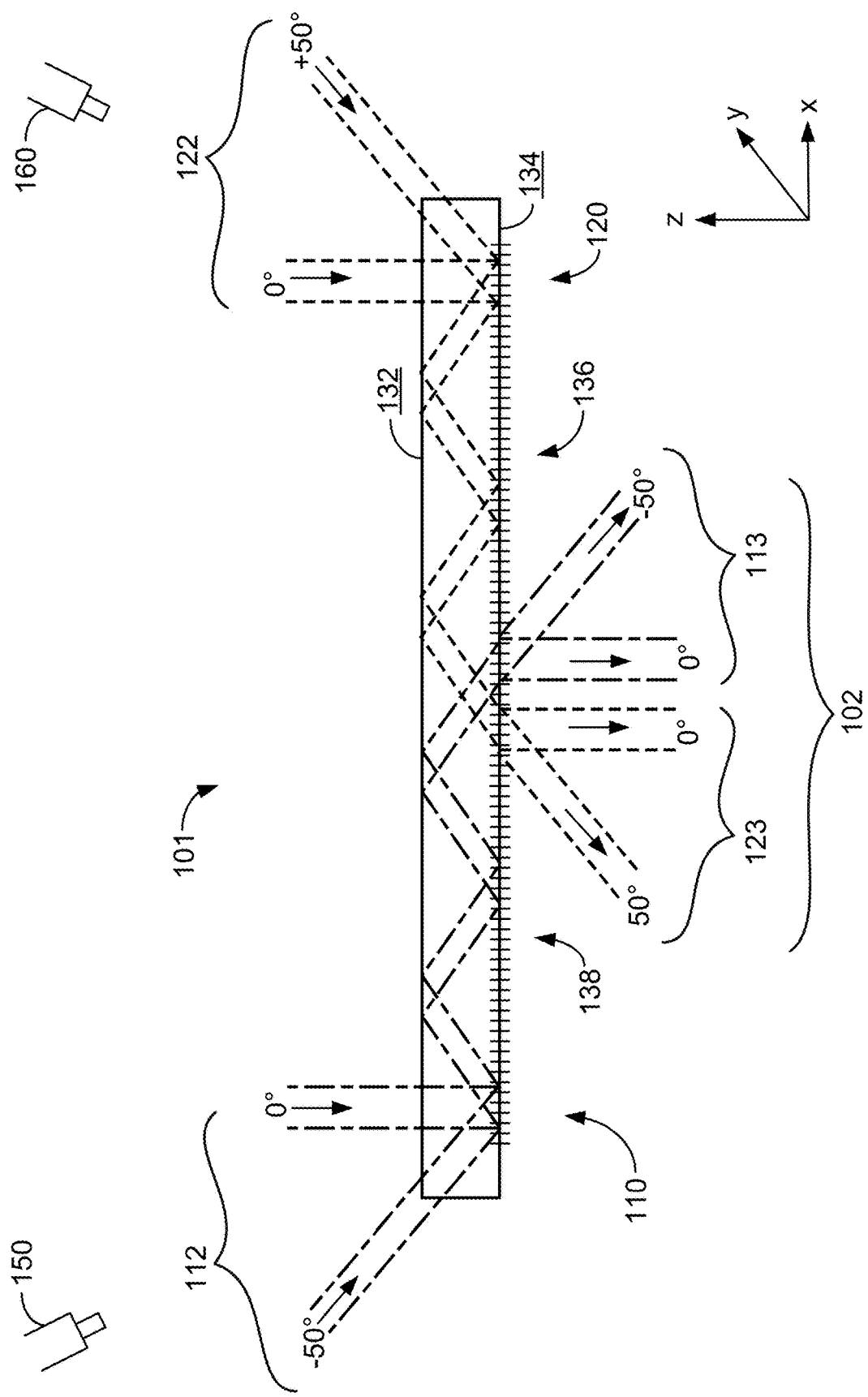
FIG. 2A is a simplified cross-sectional diagram illustrating an eyepiece waveguide with decreased grating period according to an embodiment of the present invention.
Figure 2B:
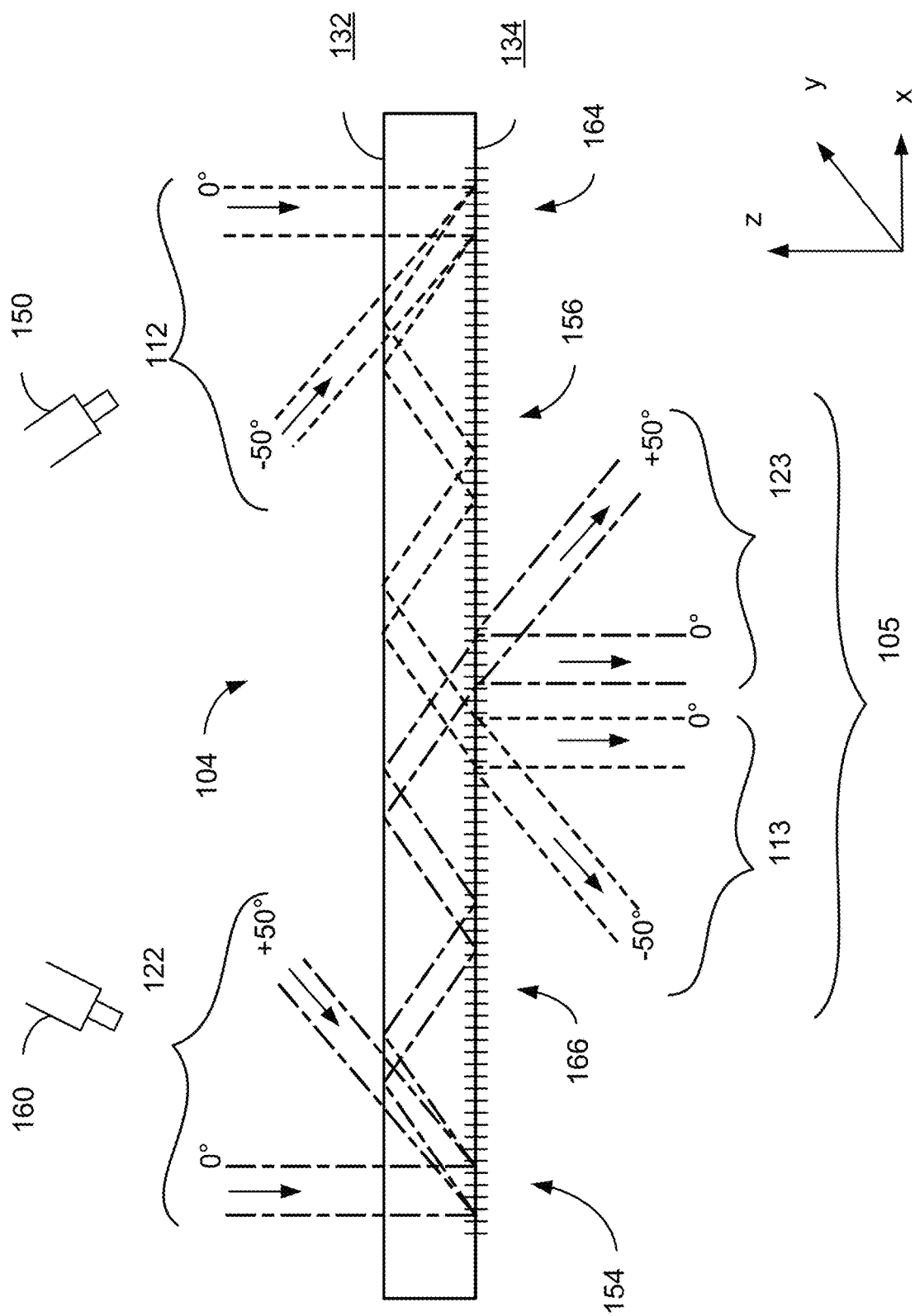
FIG. 2B is a simplified cross-sectional diagram illustrating an eyepiece waveguide with increased grating period according to an embodiment of the present invention.

FIG. 1 is a simplified plan view diagram illustrating an eyepiece waveguide according to an embodiment of the present invention. As illustrated in FIG. 1, eyepiece waveguide 100 includes a first incoupling grating (ICG) 110 and a second ICG 120. A combined pupil expander-extractor (CPE) element 130 is disposed between first ICG 110 and second ICG 120. Eyepiece waveguide 100 can achieve an expanded field of view that can be larger than the range of propagation angles that can be supported in guided propagation modes in the thickness direction of the waveguide. As illustrated in FIGS. 2A and 2B, eyepiece waveguide 100 has a first surface 132 and a second surface 134. As discussed further below, different diffractive features can be formed on or in the opposing surfaces 132 and 134 of eyepiece waveguide 100.

First ICG 110 receives a set of input beams 112 from first projector 150 (illustrated in FIG. 2A) and second ICG 120 receives a set of input beams 122 from second projector 160 (also illustrated in FIG. 2A). In some embodiments, the input beams can propagate from the projector through free space until they are incident on one of the ICGs. As illustrated in FIG. 1, set of input beams 112 incident on ICG 110 and set of input beams 122 incident on ICG 120 are angled or tilted with respect to the z-axis. ICG 110 and ICG 120 diffract the input beams so that a portion, which may be all, of the input beams enter guided propagation modes within eyepiece waveguide 100. The grating lines of ICG 110 and ICG 120 can be oriented so as to direct the diffracted beams along the x-axis toward CPE 130.

CPE 130 can include a plurality of diffractive features that exhibit period along multiple axes. Thus, CPE 130 may be composed of an array of scattering features arranged in a 2D lattice. The individual scattering features can be, for example, indentations or protrusions of any shape. The 2D array of scattering features has associated grating vectors, which are derived from the reciprocal lattice of that 2D lattice. As one example, CPE 130 could be a 2D diffraction grating composed of a crossed grating with grating lines that repeat along two or more directions of period. The diffractive features that make up CPE 130 can have a relatively low diffraction efficiency (e.g., 10% or less). Accordingly, this low diffraction efficiency allows beams of light to be replicated in a spatially distributed manner in multiple directions as they propagate through CPE 130.

FIG. 2A is a simplified cross-sectional diagram illustrating an eyepiece waveguide with decreased grating period according to an embodiment of the present invention. The design illustrated in FIG. 2A results in light incident on one side of the eyepiece waveguide being preferentially outcoupled on the same side of the eyepiece waveguide, thereby providing high efficiency as light is not lost during propagation across the eyepiece waveguide, but is outcoupled after a short propagation path. Moreover, image sharpness is maintained as the propagation distance and number of TIR reflections is reduced. As illustrated in FIG. 2A, the grating period, which is inversely related to the grating pitch measured between grating teeth, is selected such that light rays of the set of input beams 122 of a given wavelength incident on ICG 120 at an angle greater than zero (i.e., tilted with respect to the z-axis at a positive angle) is incoupled along a direction centered on the negative x-axis. For this grating with decreased grating period and increased grating pitch, if light, at the given wavelength, was incident at normal incidence, the light would be incoupled along a direction tilted up by a positive angle with respect to the negative x-axis. Thus, the decreased grating period utilizes an incoupling grating that is weaker than conventional designs. In other words, if a range of in-waveguide angles was associated with incoupling of a range of angles centered on normal incidence, the grating period will be decreased such that a range of angles tilted with respect to the z-axis by a positive angle will be incoupled into the same range of in-waveguide angles.

Accordingly, the cone of angles defined by light rays 122 tilted at an angle ranging from 0° to +50° with respect to the z-axis is incoupled into eyepiece waveguide 101 and experiences TIR as the cone of angles propagates down the waveguide. In order to project light that is incident at non-normal angles, projector 160 can be tilted with respect to the eyepiece waveguide, optics can be utilized to introduce a non-normal angle of incidence from a projector oriented normal to the eyepiece waveguide, or the like.

In the embodiment illustrated in FIG. 2A, outcoupling grating 136 has a grating period that matches the grating period of ICG 120. Accordingly, a cone of angles 123 ranging from 0° to 50° with respect to the z-axis are outcoupled from eyepiece waveguide 101. In other words, if a range of in-waveguide angles was propagating in the eyepiece waveguide 101, the grating period of the outcoupling grating 136 will be decreased such that a range of angles tilted with respect to the z-axis by a positive angle will be outcoupled from the same range of in-waveguide angles. Although the incoupling and outcoupling are illustrated on opposing surfaces of eyepiece waveguide 101, this is not required by the present invention and incoupling and outcoupling can occur from a same surface.

Similarly, the grating period of incoupling grating 110 is selected such that light rays of input beams 112 of a given wavelength incident on ICG 110 at a range of angles less than zero (i.e., tilted with respect to the z-axis at a negative angle) are incoupled along a direction centered on the positive x-axis. For this grating with decreased grating period and increased grating pitch, if light, at the given wavelength, was incident at normal incidence, the light was be incoupled along a direction tilted up by a positive angle with respect to the x-axis. Accordingly, the cone of angles defined by light rays 112 tilted at an angle ranging from 0° to −50° with respect to the z-axis is incoupled into eyepiece waveguide 101 and experiences TIR as the cone of angles propagates down the waveguide. In order to project light that is incident at non-normal angles, projector 150 can be tilted with respect to the eyepiece waveguide, optics can be utilized to introduce a non-normal angle of incidence from a projector oriented normal to the eyepiece waveguide, or the like.

In the embodiment illustrated in FIG. 2A, outcoupling grating 138 has a grating period that matches the grating period of incoupling grating 110. Accordingly, a cone of angles 113 ranging from 0° to −50° with respect to the z-axis is outcoupled from eyepiece waveguide 101. Although the incoupling and outcoupling are illustrated on opposing surfaces of eyepiece waveguide 101, this is not required by the present invention and incoupling and outcoupling can occur from a same surface.

Thus, utilizing two projectors as illustrated in FIG. 2A, the two fields of view produced by projector 150 and projector 160 are thus biased by a predetermined angle with respect to the normal to the eyepiece waveguide, resulting in the illustrated tiled field of view, i.e., a combined field of view 102. Thus, embodiments of the present invention utilize a waveguide in which the carrying capacity of the waveguide (i.e., based on TIR angles) is fully utilized in conjunction with non-normal incident light and modification of grating period from conventional designs to produce tiled fields of view.

Therefore, using designs characterized by a decreased grating period, light injected at an ICG positioned on one side of the eyepiece waveguide is preferentially outcoupled on the same side of the eyepiece waveguide to form a sub-display of a combined field of view. As illustrated in FIG. 2A, light rays 122 defining a cone of angles tilted at an angle ranging from 0° to 50° with respect to the z-axis are incoupled into eyepiece waveguide 101 and outcoupled as light rays in cone of angles 123, forming a first sub-display covering an angular range from 0° to 50° with respect to the z-axis. Concurrently, light rays 112 defining a cone of angles tilted at an angle ranging from 0° to −50° with respect to the z-axis are incoupled into eyepiece waveguide 101 and outcoupled as light rays in cone of angles 113, forming a second sub-display covering an angular range from 0° to −50° with respect to the z-axis. The combined field of view 102 is formed by tiling of the first sub-display and the second sub-display to form combined field of view 102 equal to 100° covering an angular range from −50° to 50°.

Utilizing polymer eyepiece waveguide materials, including polymers with an index of refraction ~1.75, conventional eyepiece waveguide designs can achieve a field of view of ~50°. By utilizing the eyepiece waveguide with increased grating period illustrated in FIG. 2A, a combined field of view of up to 100° can be achieved in a tiled configuration using symmetric projector tilt to produce a tilt in the incident angle and matching increases in grating period for the incoupling and outcoupling gratings, resulting in a symmetric tilting of the output light and a tiled field of view. Alternatively, a combined field of view ranging between 50° and 100° can be achieved in a partially overlapped configuration.

Although FIG. 2A illustrates light being incoupled into the eyepiece waveguide at a given angle and outcoupled from the eyepiece waveguide at the given angle, this is not required by the present invention. In other embodiments, the grating period of the incoupling grating and outcoupling gratings are modified to enable incoupling of a first cone of angles centered at a first angle and outcoupling of a second cone of angles centered at a second angle different from the first angle. One of ordinary skill in the art would recognize many variations, modifications, and alternatives.

The structure of the gratings utilized in the embodiment illustrated in FIG. 2A can be varied at different regions of the eyepiece waveguide. In this design with decreased grating period, blazed gratings can be used to increase outcoupling efficiency. As an example, gratings 136 can be blazed to increase their efficiency for light received from projector 160 and gratings 138 can be blazed to increase their efficiency for light received from projector 150. This blazed grating design will result in less light from projector 150 being outcoupled by gratings 136 and less light from projector 160 being outcoupled by gratings 138. In the central region between gratings 136 and gratings 138, the grating structure can be graded to start with one blazed grating profile and end with the other blazed grating profile with a binary grating in the central region. In addition to blazed gratings, other diffractive surfaces, particularly surfaces that are characterized by differing diffraction efficiencies depending on the direction of the incoming light, including meta-surfaces and meta-materials, volume phase holograms, stepped gratings, and the like can be utilized. One of ordinary skill in the art would recognize many variations, modifications, and alternatives.

FIG. 2B is a simplified cross-sectional diagram illustrating an eyepiece waveguide with increased grating period according to an embodiment of the present invention. The design illustrated in FIG. 2B results in light incident on one side of the eyepiece waveguide being preferentially outcoupled on the opposite side of the eyepiece waveguide. Using designs with increased grating period, the spatial separation between the incoupling gratings and the outcoupling gratings can be decreased while providing room for the image size to expand, reducing the size of the eyepiece waveguide. As illustrated in FIG. 2B, the grating period, which is inversely related to the grating pitch measured between grating teeth, is selected such that light rays 122 of a given wavelength incident on ICG 154 at an angle greater than zero (i.e., tilted with respect to the z-axis at a positive angle) is incoupled along a direction centered on the positive x-axis. For this grating with increased grating period and decreased grating pitch, if light, at the given wavelength, was incident at normal incidence, the light would be incoupled along a direction tilted up by a positive angle with respect to the positive x-axis. Thus, the increased grating period utilizes an incoupling grating that is stronger than conventional designs. Accordingly, the cone of angles defined by light rays 122 tilted at an angle ranging from 0° to +50° with respect to the z-axis is incoupled into eyepiece waveguide 104 and experiences TIR as the cone of angles propagates down the waveguide. In order to project light that is incident at non-normal angles, projector 160 can be tilted with respect to the eyepiece waveguide, optics can be utilized to introduce a non-normal angle of incidence from a projector oriented normal to the eyepiece waveguide, or the like.

In the embodiment illustrated in FIG. 2B, outcoupling grating 156 has a grating period that matches the grating period of ICG 154. Accordingly, a cone of angles 123 ranging from 0° to 50° with respect to the z-axis is outcoupled from eyepiece waveguide 104. Although the incoupling and outcoupling are illustrated on opposing surfaces of eyepiece waveguide 104, this is not required by the present invention and incoupling and outcoupling can occur from a same surface.

Similarly, the grating period of incoupling grating (ICG) 164 is selected such that light rays 112 of a given wavelength incident on ICG 164 at a range of angles less than zero (i.e., tilted with respect to the z-axis at a negative angle) are incoupled along a direction centered on the negative x-axis. For this grating with increased grating period and decreased grating pitch, if light, at the given wavelength, was incident at normal incidence, the light would be incoupled along a direction tilted up by a positive angle with respect to the negative x-axis. Accordingly, the cone of angles defined by light rays 112 tilted at an angle ranging from 0° to −50° with respect to the z-axis is incoupled into eyepiece waveguide 104 and experiences TIR as the cone of angles propagates down the waveguide. In order to project light that is incident at non-normal angles, projector 150 can be tilted with respect to the eyepiece waveguide, optics can be utilized to introduce a non-normal angle of incidence from a projector oriented normal to the eyepiece waveguide, or the like.

In the embodiment illustrated in FIG. 2B, outcoupling grating 166 has a grating period that matches the grating period of incoupling grating 164. Accordingly, a cone of angles 113 ranging from 0° to −50° with respect to the z-axis is outcoupled from eyepiece waveguide 104. Although the incoupling and outcoupling are illustrated on opposing surfaces of eyepiece waveguide 104, this is not required by the present invention and incoupling and outcoupling can occur from a same surface.

Thus, utilizing two projectors as illustrated in FIG. 2B, the two fields of view produced by projector 150 and projector 160 are thus biased by a predetermined angle with respect to the normal to the eyepiece waveguide, resulting in the illustrated tiled field of view, i.e., a combined field of view 105. Thus, embodiments of the present invention utilize a waveguide in which the carrying capacity of the waveguide (i.e., based on TIR angles) is fully utilized in conjunction with non-normal incident light and modification of grating period from conventional designs to produce tiled fields of view.

Therefore, using designs characterized by an increased grating period, light injected at an ICG positioned on one side of the eyepiece waveguide propagates to the other side of the eyepiece waveguide where it is outcoupled to form a sub-display of a combined field of view. As illustrated in FIG. 2B, light rays 122 defining a cone of angles tilted at an angle ranging from 0° to 50° with respect to the z-axis are incoupled into eyepiece waveguide 104 and outcoupled as light rays 123, forming a first sub-display covering an angular range from 0° to 50° with respect to the z-axis. Concurrently, light rays 112 defining a cone of angles tilted at an angle ranging from 0° to −50° with respect to the z-axis are incoupled into eyepiece waveguide 104 and outcoupled as light rays 113, forming a second sub-display covering an angular range from 0° to −50° with respect to the z-axis. The combined field of view 105 is formed by tiling of the first sub-display and the second sub-display to form combined field of view 105 equal to 100° covering an angular range from −50° to 50°.

Utilizing polymer eyepiece waveguide materials, including polymers with an index of refraction ~1.75, conventional eyepiece waveguide designs can achieve a field of view of ~50°. By utilizing the eyepiece waveguide with increased grating period illustrated in FIG. 2B, a combined field of view of up to 100° can be achieved in a tiled configuration using symmetric projector tilt to produce a tilt in the incident angle and matching increases in grating period for the incoupling and outcoupling gratings, resulting in a symmetric tilting of the output light and a tiled field of view. Alternatively, a combined field of view ranging between 50° and 100° can be achieved in a partially overlapped configuration.

Although FIG. 2B illustrates light being incoupled into the eyepiece waveguide at a given angle and outcoupled from the eyepiece waveguide at the given angle, this is not required by the present invention. In other embodiments, the grating period of the incoupling grating and outcoupling gratings are modified to enable incoupling of a first cone of angles centered at a first angle and outcoupling of a second cone of angles centered at a second angle different from the first angle. One of ordinary skill in the art would recognize many variations, modifications, and alternatives.

The structure of the gratings utilized in the embodiment illustrated in FIG. 2B can be varied at different regions of the eyepiece waveguide. In this design with increased grating period, blazed gratings can be used to increase outcoupling efficiency. As an example, gratings 156 can be blazed to increase their efficiency for light received from projector 160 and gratings 166 can be blazed to increase their efficiency for light received from projector 150. This blazed grating design will result in less light from projector 150 being outcoupled by gratings 156 and less light from projector 160 being outcoupled by gratings 166. In the central region between gratings 156 and gratings 166, the grating structure can be graded to start with one blazed grating profile and end with the other blazed grating profile with a binary grating in the central region. One of ordinary skill in the art would recognize many variations, modifications, and alternatives.

Figure 3A:
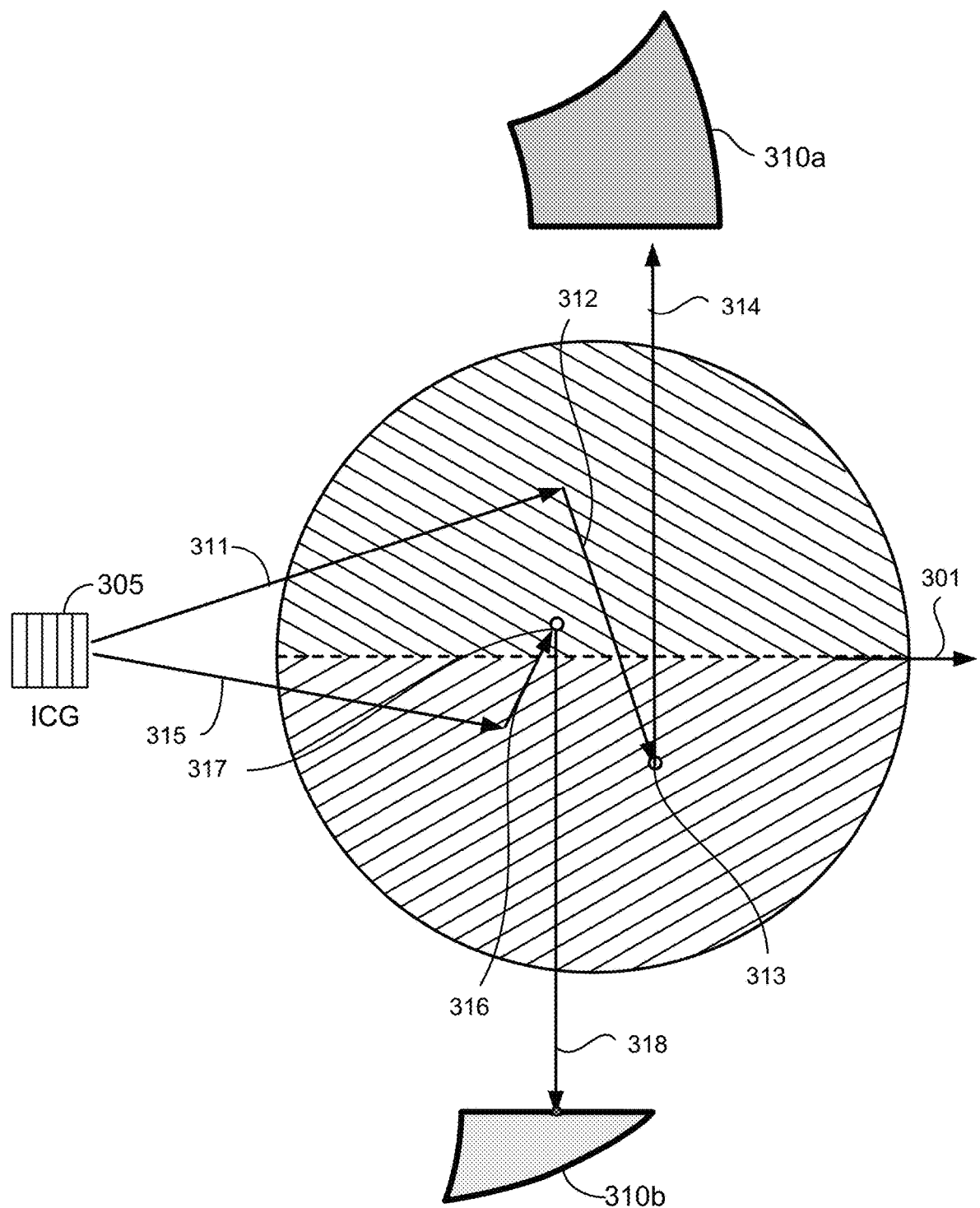
FIG. 3A is a simplified plan view diagram illustrating elements of an eyepiece waveguide with increased grating period and a combined field of view according to an embodiment of the present invention.

FIG. 3A is a simplified plan view diagram illustrating elements of an eyepiece waveguide with increased grating period and a combined field of view according to an embodiment of the present invention. In FIG. 3A, propagation and diffraction of light rays in the waveguide display are illustrated as well as a resulting field of view. As illustrated in FIG. 3A, diffraction of input light by ICG 305 results in light diffracted into and propagating in the plane of the waveguide as illustrated by light rays 311 and 315. As will be described, light rays represented by light ray 311 and light rays represented by light ray 315 will result in the generation of a field of view 310 (illustrated in FIG. 3D) that includes a first portion 310a and a second portion 310b.

Light ray 311 propagates up and to the right after diffraction from ICG 305 and diffracts from gratings in the top portion of the waveguide, producing light ray 312, which propagates down and to the right. This OPE diffraction event is represented by arrow 322 in FIG. 3B. Light ray 312 propagates in the waveguide and diffracts from gratings in the lower portion of the waveguide, producing outcoupling event 313. Outcoupled light ray 314 is illustrated as propagating up toward the user from the lower portion of the waveguide, thereby producing first portion 310a of field of view 310, which is associated with the lower portion of the user's field of view.

Concurrently, light ray 315 propagates down and to the right near axis 301 and diffracts from gratings in the lower portion of the waveguide near axis 301, producing light ray 316, which propagates up and to the right. This OPE diffraction event is represented by arrow 332 in FIG. 3C. Light ray 316 propagates in the waveguide and diffracts from gratings in the upper portion of the waveguide near axis 301, producing outcoupling event 317. Outcoupled light ray 318 is illustrated as propagating down toward the user from the upper portion of the waveguide near axis 301, thereby producing lower portion 310b of field of view 310.

Thus, field of view 310 includes first portion 310a, associated with light ray 311 as well as second portion 310b associated with light ray 315. As will be evident to one of skill in the art, rays incoupled at intermediate angles and operable to propagate in the waveguide will fill out field of view 310.

Figure 3B:
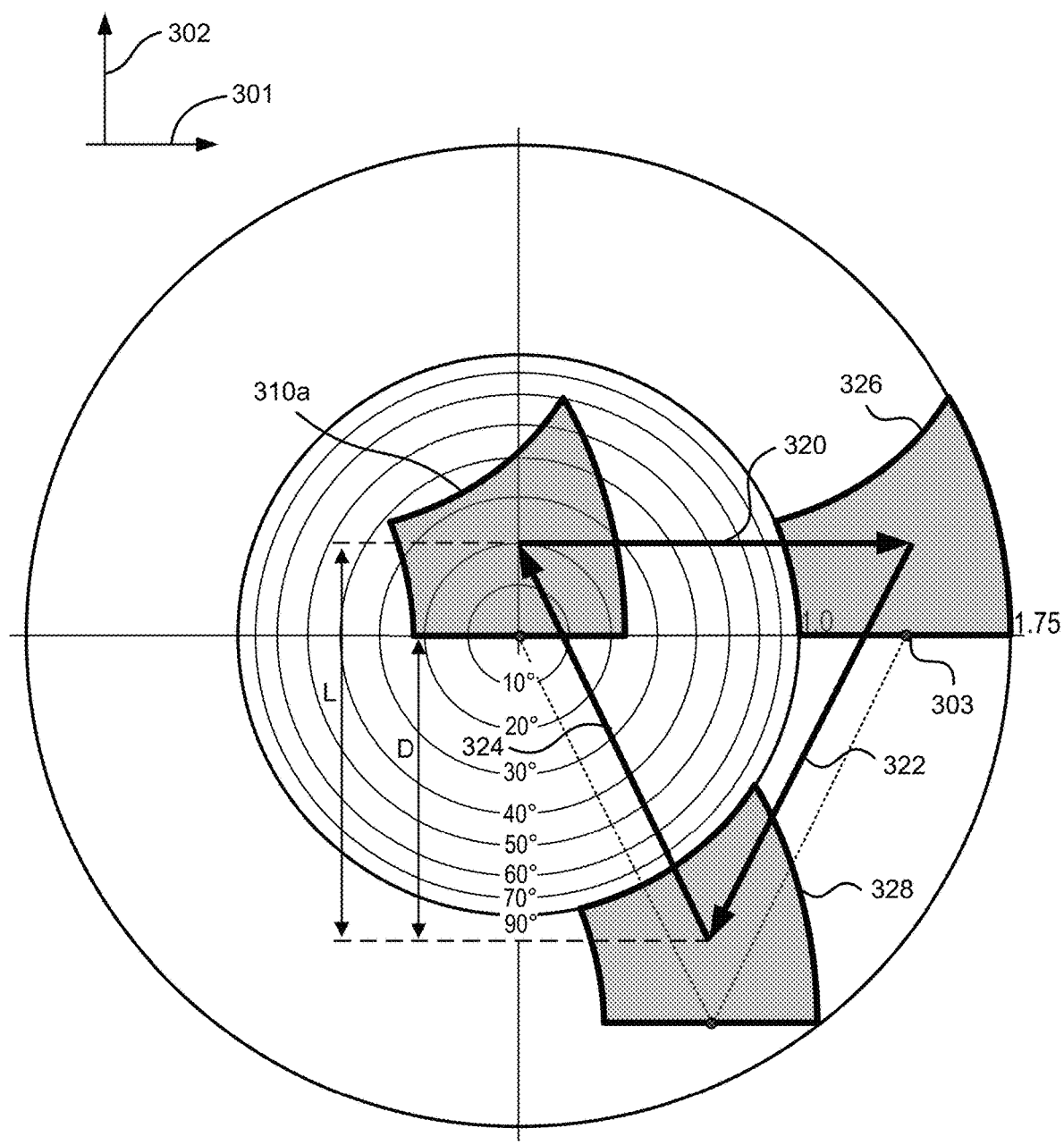
FIG. 3B is a simplified k-space diagram illustrating operation of the eyepiece waveguide illustrated in FIG. 3A for a first set of light rays forming a first portion of a field of view.

FIG. 3B is a simplified k-space diagram illustrating operation of the eyepiece waveguide illustrated in FIG. 3A for a first set of light rays forming a first portion of a field of view. As illustrated in FIG. 3B, the first portion 310a of field of view 310 travels through the k-space diagram as represented by positions 326 and 328 so that it is not clipped by the boundaries of the annulus defined by the circle positioned at n=1.0 and the circle positioned at n=1.75 corresponding to the in-waveguide angles. Diffraction in the plane of the eyepiece waveguide and diffraction out of the plane of the eyepiece waveguide thus result in travel in the k-space diagram through regions that propagate inside the eyepiece waveguide.

Referring to FIG. 3B, diffraction from ICG 305 is represented by arrow 320 representing a grating vector translating the first portion 310a of the field of view to the in-waveguide region of the k-space diagram as illustrated by position 326. The OPE diffraction event resulting from light ray 311 diffracting to produce light ray 312 as illustrated in FIG. 3A is represented by arrow 322 in FIG. 3B, translating the first portion 310a of the field of view from position 326 in the in-waveguide region of the k-space diagram to position 328, which is also in the in-waveguide region of the k-space diagram. The EPE outcoupling event 313 resulting from light ray 312 diffracting to produce outcoupled light ray 314 is represented by arrow 324 in FIG. 3B, translating the first portion 310a of the field of view from position 328 in the in-waveguide region of the k-space diagram to the eye-space region of the k-space diagram associated with first portion 310a of the field of view.

Thus, as indicated by the k-space diagram illustrated FIG. 3B, light in the lower portion of the user's field of view is formed by light rays propagating up toward the user from the lower portion of the waveguide, thereby producing first portion 310a of field of view 310.

The k-space diagram in FIG. 3B demonstrates that the eyepiece waveguide design illustrated in FIG. 3A has a grating spacing along axis 302 that is characterized by an increased grating period since the center of field of view 310a is translated as a result of OPE and EPE diffraction event by a distance measured along axis 302 that is greater than the distance from the origin to the position along axis 302 at which the center of the field of view represented at position 328 is located. In other words, referring to FIG. 3B, the distance L, which is measured along axis 302, is greater than the distance D. In comparison, considering the magnitude of the translation along axis 301, the distance from the origin to point 303 is equal to the distance the center of field of view 310a is translated along axis 301 since the grating spacing along axis 301 is not characterized by an increased grating period or a decreased grating period.

Thus, using eyepiece waveguide designs that include grating lines oriented at ~60° to each other, light can flow in the k-space diagram along three different grating vectors: arrow 320 representing a grating vector aligned with axis 301, which represents diffraction by the ICG into the plane of the eyepiece waveguide and translates field of view 310a to position 326; arrow 322 representing a grating vector oriented at ~−120° to axis 301 and translating the field of view at position 326 to position 328; and arrow 324 representing a grating vector oriented at ~60° to axis 301 and translating the field of view at position 328 to field of view 310a. Since positions 326 and 328 are within the annulus of in-waveguide angles, light diffracted along these three different grating vectors will be maintained in the eyepiece waveguide.

Figure 3C:
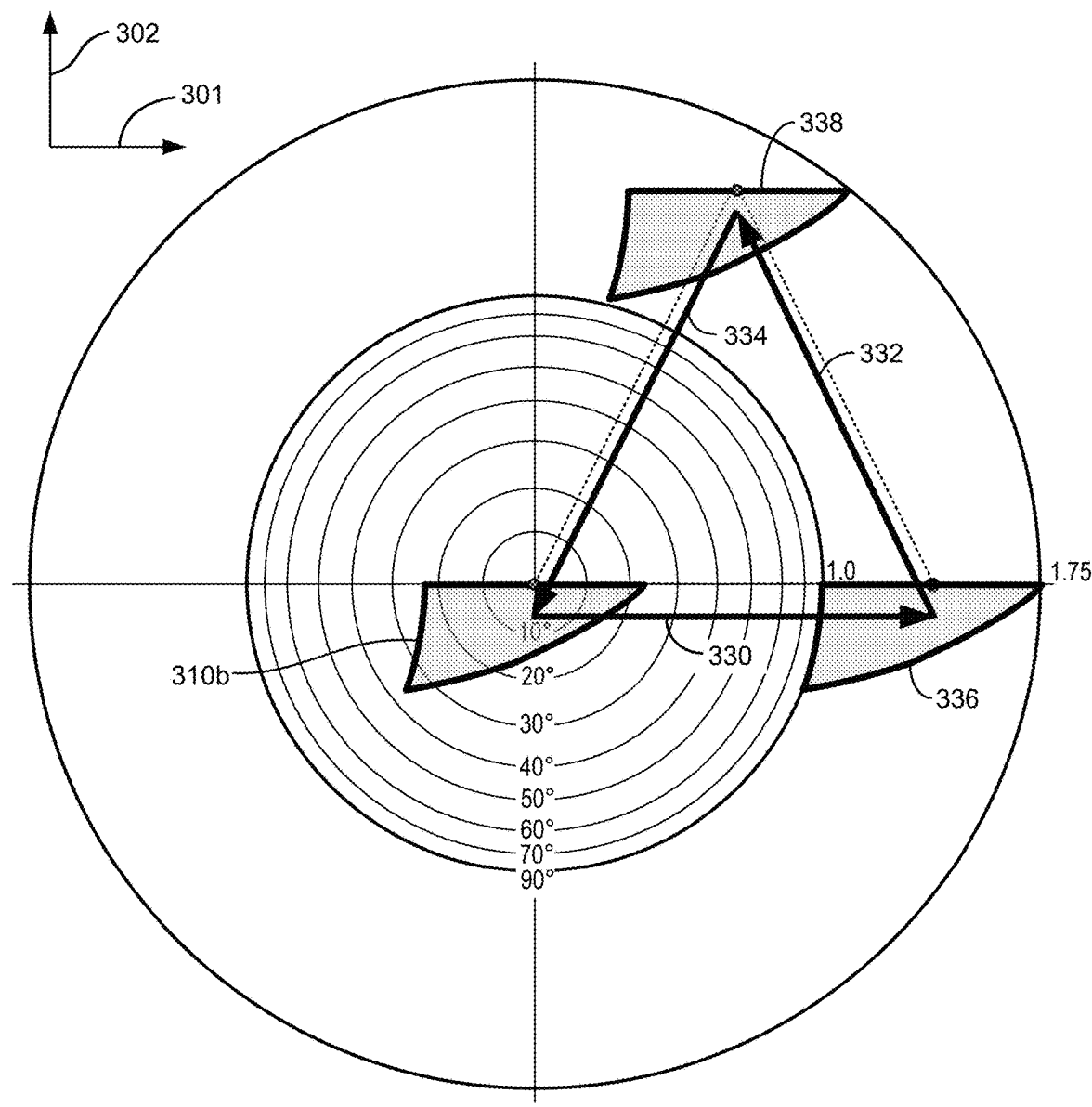
FIG. 3C is a simplified k-space diagram illustrating operation of the eyepiece waveguide illustrated in FIG. 3A for a second set of light rays forming a second portion of a field of view.

FIG. 3C is a simplified k-space diagram illustrating operation of the eyepiece waveguide illustrated in FIG. 3A for a second set of light rays forming a second portion of a field of view. Referring to FIG. 3A, light ray 315, after diffraction from ICG 305, propagates down and to the right near axis 301, eventually resulting in generation of outcoupled light ray 318. As illustrated in FIG. 3C, diffraction from ICG 305 is represented by arrow 330, translating the second portion 310b of the field of view to the in-waveguide region of the k-space diagram as illustrated by position 336. The OPE diffraction event resulting from light ray 315 diffracting to produce light ray 315 as illustrated in FIG. 3A is represented by arrow 332 in FIG. 3C, translating the second portion 310b of the field of view from position 336 in the in-waveguide region of the k-space diagram to position 338, which is also in the in-waveguide region of the k-space diagram. The EPE outcoupling event 317 resulting from light ray 316 diffracting to produce outcoupled light ray 318 is represented by arrow 334 in FIG. 3C, translating the second portion 310b of the field of view from position 338 in the in-waveguide region of the k-space diagram to the eye-space region of the k-space diagram associated with second portion 310b of the field of view.

As discussed in relation to first portion 310 shown in FIG. 3B, second portion 310b of field of view 310 travels through the k-space diagram as represented by positions 336 and 338 so that it is not clipped by the boundaries of the annulus defined by the circle positioned at n=1.0 and the circle positioned at n=1.75 corresponding to the in-waveguide angles. Diffraction in the plane of the eyepiece waveguide and diffraction out of the plane of the eyepiece waveguide thus results in travel in the k-space diagram through regions that propagate inside the eyepiece waveguide.

Figure 3D:
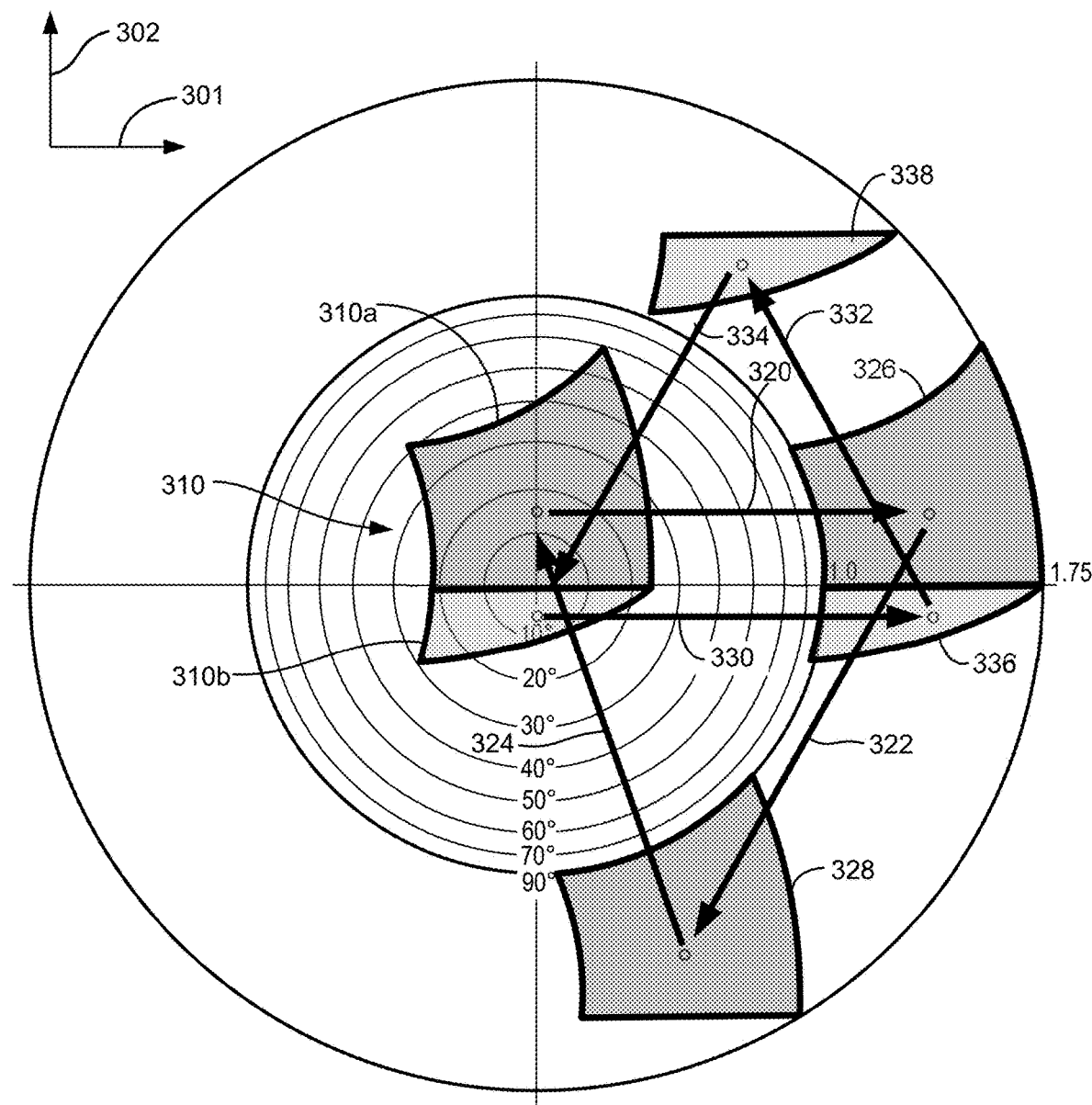
FIG. 3D is a simplified k-space diagram illustrating operation of the eyepiece waveguide illustrated in FIG. 3A for the field of view.

FIG. 3D is a simplified k-space diagram illustrating operation of the eyepiece waveguide illustrated in FIG. 3A for the field of view. In the k-space diagram illustrated in FIG. 3D, first portion 310a and second portion 310b of the field of view 310 are shown. As discussed in relation to FIGS. 3A-3C, light rays diffracted into the waveguide by the ICG and propagating to the right and generally up, as well as down at small angles with respect to axis 301, can be represented in k-space by translation of field of view 310 to positions 326 and 336, representing propagation in the waveguide. OPE interactions represented by arrows 322 and 332 represent propagation from an upper portion of the waveguide to a lower portion of the waveguide and propagation from a lower portion of the waveguide to an upper portion of the waveguide, respectively. Finally, EPE interactions are represented by outcoupling that is represented by field of view 310 at angles in the eye-space region.

Thus, field of view 310 includes first portion 310a, associated with light ray 311 as well as second portion 310b associated with light ray 315. As will be evident to one of skill in the art, rays incoupled at intermediate angles and operable to propagate in the waveguide will fill out field of view 310.

Figure 3E:
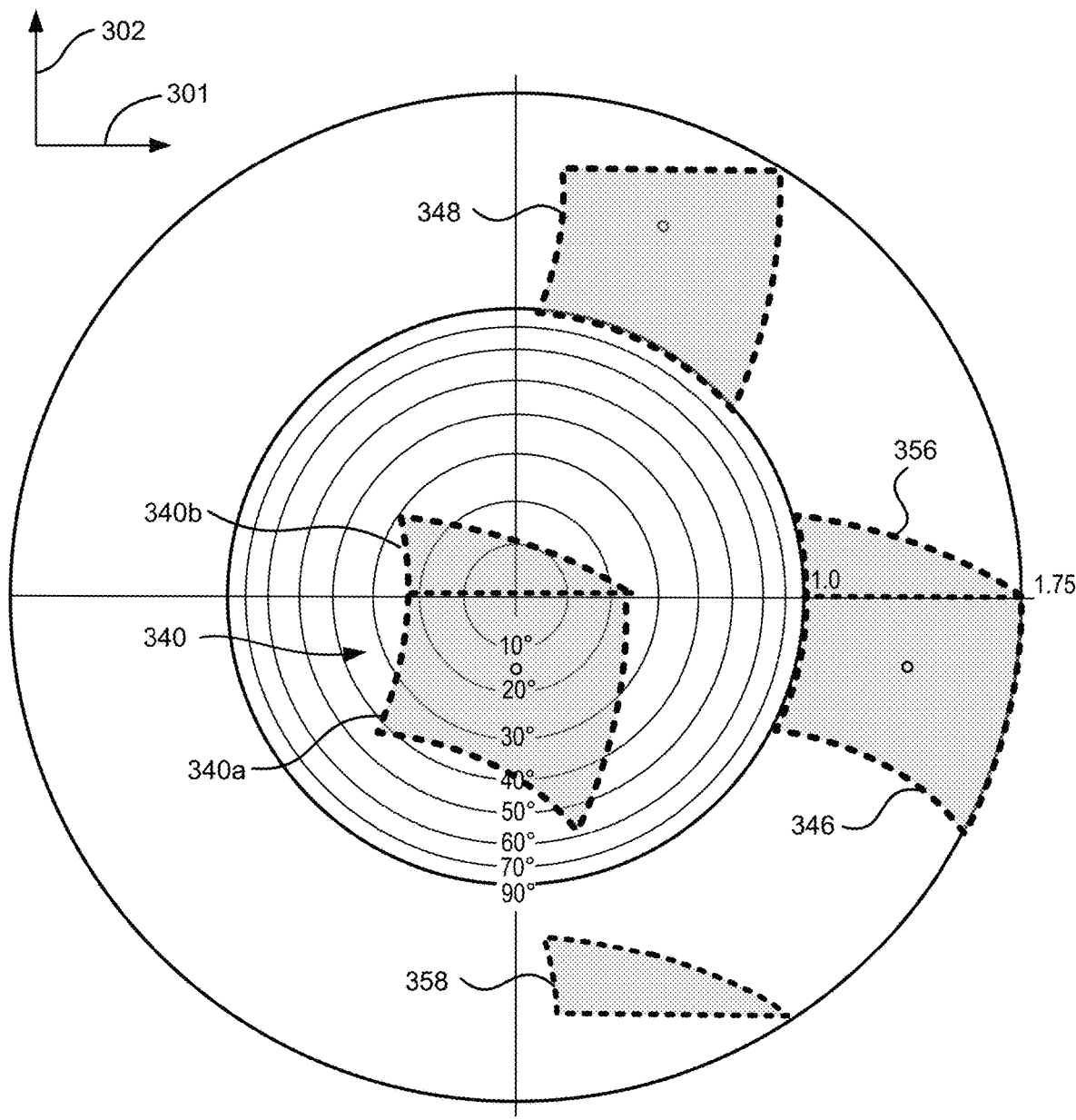
FIG. 3E is a simplified k-space diagram illustrating operation of the eyepiece waveguide illustrated in FIG. 3A for an alternate field of view.

FIG. 3E is a simplified k-space diagram illustrating operation of the eyepiece waveguide illustrated in FIG. 3A for an alternate field of view. In FIG. 3E, field of view 340, which is associated with the lower portion of the user's field of view, is formed as light propagates down toward the user from the upper portion of the waveguide. Thus, field of view 340 is a mirror image of field of view 310 with respect to axis 301.

Referring to FIG. 3E, first portion 340a and second portion 340b of the field of view 340 are shown. In a manner similar to the operation shown in relation to FIGS. 3A-3D, and in a mirror image fashion, light rays diffracted into the waveguide by the ICG and propagating to the right and generally down, as well as up at small angles with respect to axis 301, can be represented in k-space by translation of field of view 340 to positions 346 and 356, representing propagation in the waveguide. OPE interactions result in translation of the first portion to position 348 and translation of the second portion to position 358, respectively as these in-waveguide propagation angles are supported by the waveguide. Finally, EPE interactions are represented by outcoupling that is represented by field of view 340 at angles in the eye-space region.

Thus, as a mirror image of field of view 310, field of view 340 includes first portion 340a, associated with light rays propagating down and to the right in FIG. 3A as well as second portion 340b associated with light rays propagating up and to the right in FIG. 3A. As will be evident to one of skill in the art, rays incoupled at intermediate angles and operable to propagate in the waveguide will fill out field of view 340.

Figure 3F:
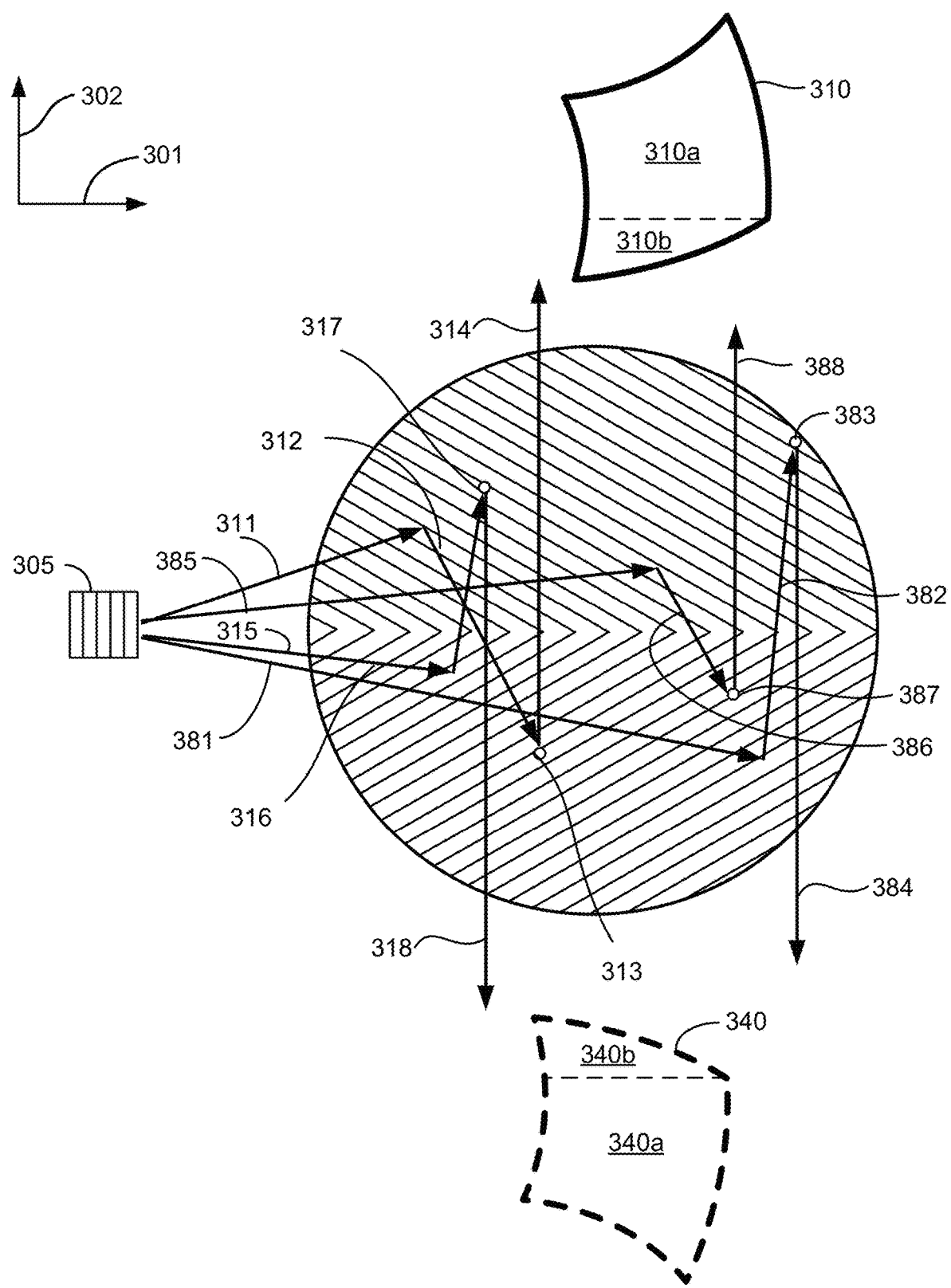
FIG. 3F is a simplified plan view diagram illustrating the eyepiece waveguide shown in FIG. 3A with exemplary light rays according to an embodiment of the present invention.

FIG. 3F is a simplified plan view diagram illustrating the eyepiece waveguide shown in FIG. 3A with exemplary light rays according to an embodiment of the present invention. In FIG. 3F, representative light rays associated with both the first and second portions of fields of view 310 and 340 are illustrated. As discussed in relation to FIG. 3A, light ray 311 propagates up and to the right after diffraction from ICG 305 and diffracts from gratings in the top portion of the waveguide, producing a light ray propagating down and to the right (OPE interaction). When this light ray interacts with gratings in the lower portion of the waveguide, an EPE event occurs, resulting in outcoupling of light ray 314 such that it propagates up toward the user from the lower portion of the waveguide, thereby producing first portion 310a of field of view 310. Concurrently, light ray 315 propagates down and to the right near axis 301 and diffracts from gratings in the lower portion of the waveguide near axis 301, producing a light ray propagating up and to the right (OPE interaction). When this light ray interacts with gratings in the top portion of the waveguide, an EPE event occurs, resulting in outcoupling of light ray 318 such that it propagates down toward the user from the top portion of the waveguide, thereby producing second portion 310b of field of view 310.

In a mirror image fashion, light ray 381 propagates down and to the right and diffracts from gratings in the lower portion of the waveguide as an OPE diffraction event, producing light ray 382, which propagates up and to the right. Light ray 382 propagates in the waveguide and diffracts from gratings in the upper portion of the waveguide, producing outcoupling event 383. Outcoupled light ray 384 is illustrated as propagating down toward the user from the upper portion of the waveguide, thereby producing first portion 340a of field of view 340, which is associated with the upper portion of the user's field of view. Concurrently, light ray 385 propagates up and to the right near axis 301 and diffracts from gratings in the upper portion of the waveguide near axis 301 as an OPE diffraction event, producing light ray 386, which propagates down and to the right. Light ray 386 propagates in the waveguide and diffracts from gratings in the lower portion of the waveguide near axis 301, producing outcoupling event 387. Outcoupled light ray 388 is illustrated as propagating up toward the user from the lower portion of the waveguide near axis 301, thereby producing second portion 340b of field of view 340.

Thus, field of view 340 includes first portion 340a, associated with light ray 381 as well as second portion 340b associated with light ray 385. As will be evident to one of skill in the art, rays incoupled at intermediate angles and operable to propagate in the waveguide will fill out field of view 340.

Also, although only four OPE interactions and four EPE interactions are illustrated for purposes of clarity, it will be appreciated that light rays 311/385 and 315/381 will experience OPE interactions throughout the top portion and the bottom portion of the waveguide, respectively. Similarly, light rays 312/386 and 316/382 will experience EPE interactions through the bottom portion and the top portion of the waveguide, respectively. Accordingly, outcoupling events will occur throughout the waveguide and outcoupling events 313/387 and 317/383 are merely exemplary. As a result, outcoupled light rays distributed across the waveguide will contribute to the generation of fields of view 310 and 340.

It should be noted that the gratings in the top and bottom portions of the waveguide intersect at axis 301 with no overlap in the embodiment illustrated in FIG. 3F. However, this is not required by the present invention and, in some other embodiments, the gratings overlap at positions along axis 302 at predetermined distances above and/or below axis 301. This overlap region will enable rays that are propagating into the top portion of the waveguide to experience OPE interactions with grating originating in the bottom portion of the waveguide and extending into the top portion of the waveguide in the overlap region. Continuing with this example, rays that are propagating into the top portion of the waveguide and experience an OPE interaction in the overlap region will diffract up into the top portion and can experience an EPE interaction that will result in an outcoupling event that will enhance the output associated with field of view 340. Similarly, light rays that are propagating into the bottom portion of the waveguide can experience OPE interactions with gratings originating in the top portion of the waveguide and extending into the bottom portion of the waveguide in the overlap region. These rays that are propagating into the bottom portion of the waveguide and experience an OPE interaction in the overlap region will diffract down into the bottom portion and can experience an EPE interaction that will result in an outcoupling event that will enhance the output associated with field of view 310.

Figure 3G:
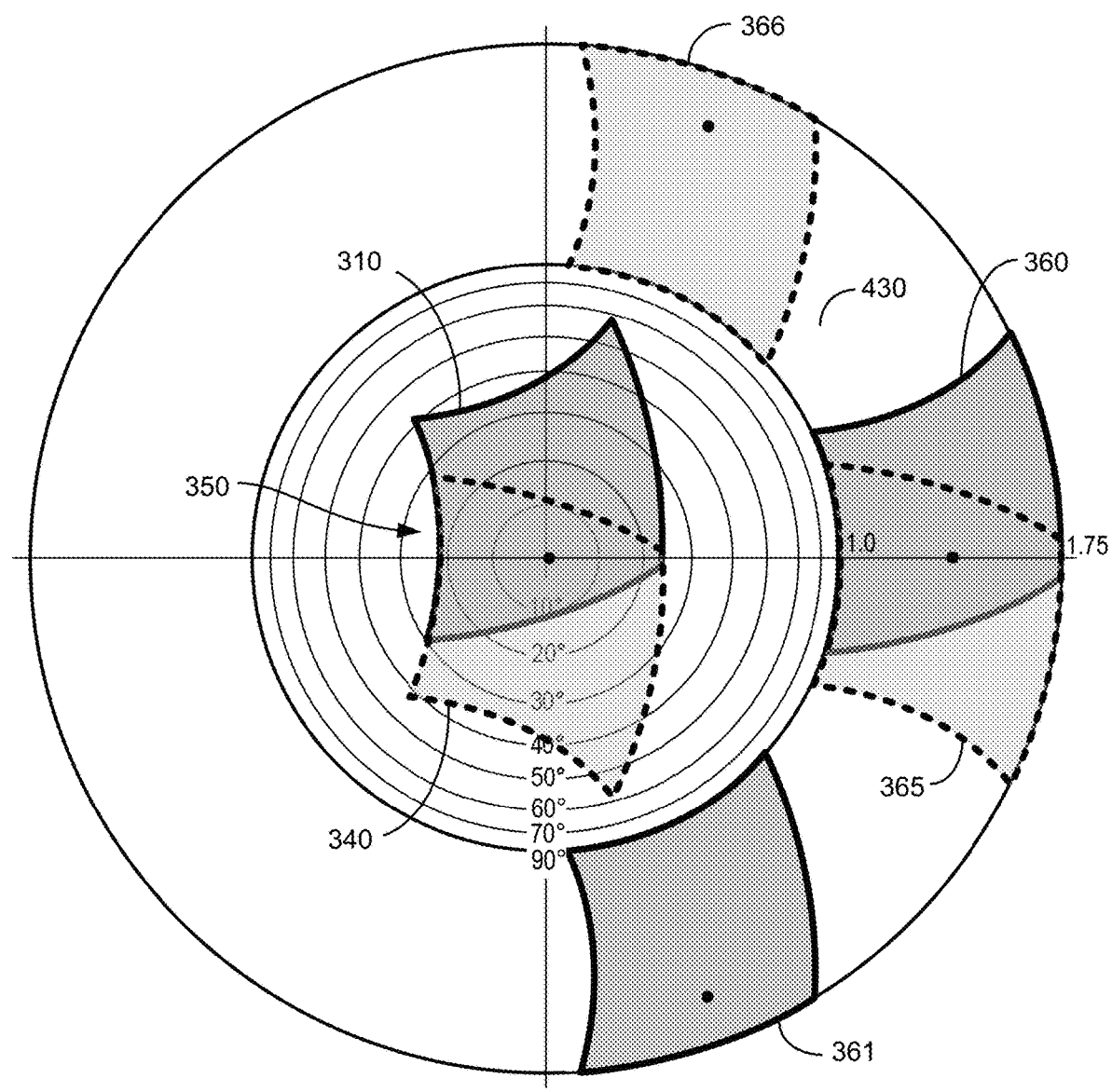
FIG. 3G is a simplified k-space diagram illustrating operation of the eyepiece waveguide illustrated in FIG. 3A for a combined field of view.

As described in relation to FIG. 3G, utilizing the waveguide design illustrated in FIGS. 3A and 3F, a combined field of view is formed by the overlap of field of view 310 and field of view 340. Thus, although each field of view individually provides a field of view (i.e., vertical×horizontal) of ~50°×~40°, the overlapped fields of view provide a combined field of view of ~80°×~40°, thereby significantly improving the user experience.

FIG. 3G is a simplified k-space diagram illustrating operation of the eyepiece waveguide illustrated in FIG. 3A for a combined field of view. Referring to FIG. 3G, combined field of view 350 is formed by the overlap between field of view 310 and field of view 340. Although translation of field of view 310 to positions 360 and 361 is illustrated for purposes of clarity, it will be appreciated that portions of this field of view translate, in k-space, through position 366. Similarly, translation of field of view 340 to positions 365 and 366 is illustrated for purposes of clarity, it will be appreciated that portions of this field of view translate, in k-space, through position 361. As illustrated in FIG. 3G, field of view 310 has a spatial extent of ~50° vertically by ~40° horizontally. Similarly, field of view 340 has a similar spatial extent. Due to the overlap between these fields of view, a combined field of view characterized by a much larger extended field of view of ~80°×~40° is formed. Thus, using embodiments of the present invention that utilize a single projector and gratings that are characterized by an increased grating period in one dimension, waveguide displays with an increased field of view are enabled.

Figure 4A:
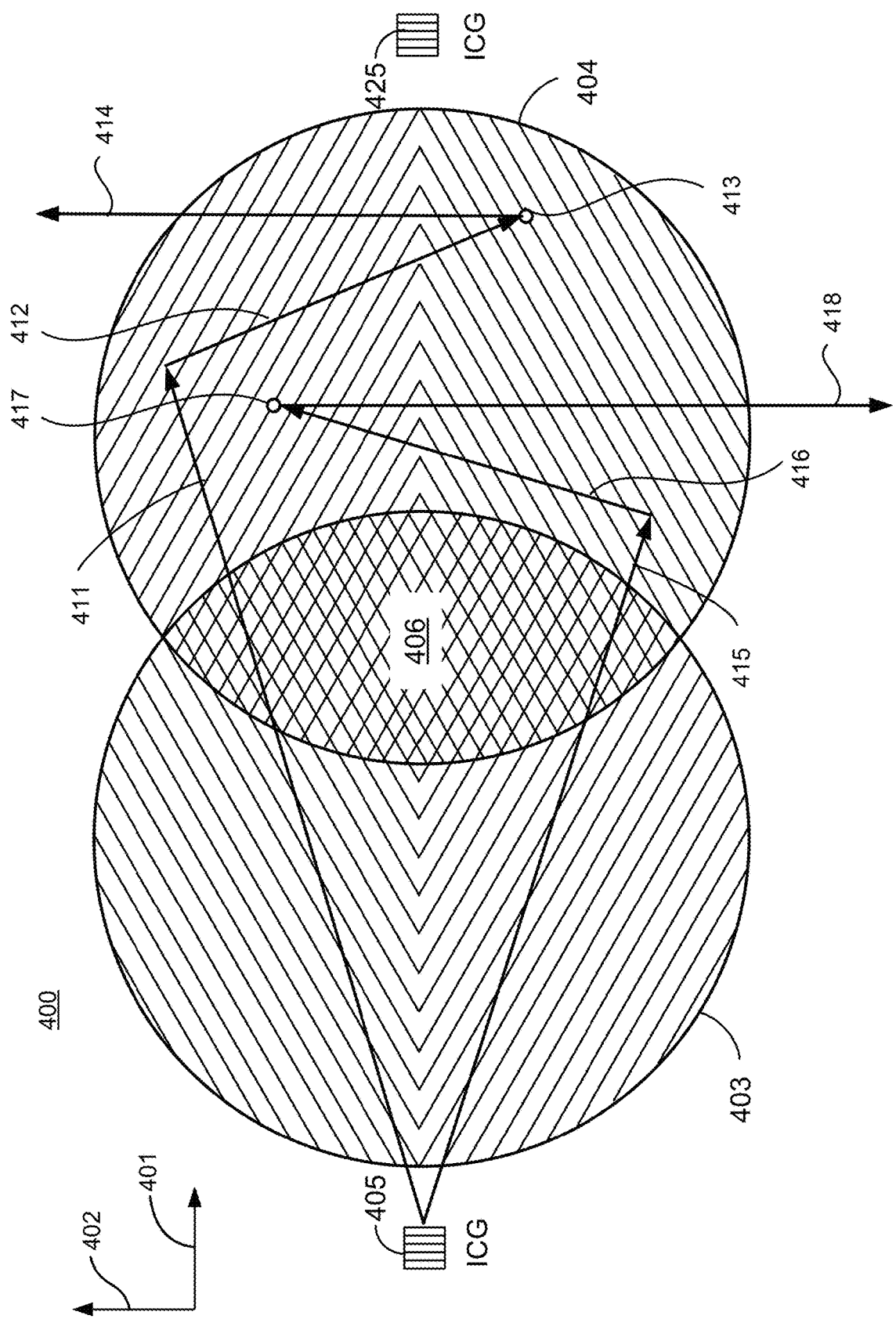
FIG. 4A is a simplified plan view diagram illustrating a multi-projector waveguide display utilizing an eyepiece waveguide with increased grating period according to an embodiment of the present invention.

FIG. 4A is a simplified plan view diagram illustrating a multi-projector waveguide display 400 utilizing an eyepiece waveguide with increased grating period according to an embodiment of the present invention. In a manner similar to that discussed in relation to FIG. 2B, diffraction of input light by ICG 405 results in light diffracted into and propagating in the plane of the waveguide as illustrated by light rays 411 and 415. As will be described, light rays represented by light ray 411 and light rays represented by light ray 415 will result in the generation of a field of view that includes two portions, each associated with light rays initially propagating into the upper half of the eyepiece waveguide and the lower half of the eyepiece waveguide, respectively.

Multi-projector waveguide display 400 includes a first region 403, which in this embodiment is circular, and a second region 404, which is also circular in this embodiment. First region 403 and second region 404 overlap to form overlap region 406. In FIG. 4A, overlap region 406 is disposed at a midpoint between the ICG 405 and ICG 425. First region 403 includes a first portion defined by the upper semicircle of first region 403 and a second portion defined by the lower semicircle of first region 403. Likewise, second region 404 includes a first portion defined by the upper semicircle of second region 404 and a second portion defined by the lower semicircle of second region 404. Overlap region 406 is formed by the overlap of the first portion of the first region and the first portion of the second region and the overlap of the second portion of the first region and the second portion of the second region. Additional description related to the eyepiece waveguide of the multi-projector waveguide display is provided in relation to FIG. 6A.

Light ray 411 propagates up and to the right after diffraction from ICG 405 and diffracts from gratings in the top portion of the waveguide, producing light ray 412, which propagates down and to the right. Light ray 412 propagates in the waveguide and diffracts from gratings in the lower portion of the waveguide, producing outcoupling event 413. Outcoupled light ray 414 is illustrated as propagating up toward the user from the lower portion of the waveguide, thereby producing a portion of the field of view associated with the lower portion of the user's field of view.

Concurrently, light ray 415 propagates down and to the right near axis 401 and diffracts from gratings in the lower portion of the waveguide near axis 401, producing light ray 416, which propagates up and to the right. Light ray 416 propagates in the waveguide and diffracts from gratings in the upper portion of the waveguide near axis 401, producing outcoupling event 417. Outcoupled light ray 418 is illustrated as propagating down toward the user from the upper portion of the waveguide near axis 401, thereby producing a lower portion of the field of view. As will be evident to one of skill in the art, rays incoupled at intermediate angles and operable to propagate in the waveguide will fill out the field of view. Referring to FIG. 4C, field of view 410 is produced by the light rays illustrated by light rays 411 and 415.

Figure 4B:
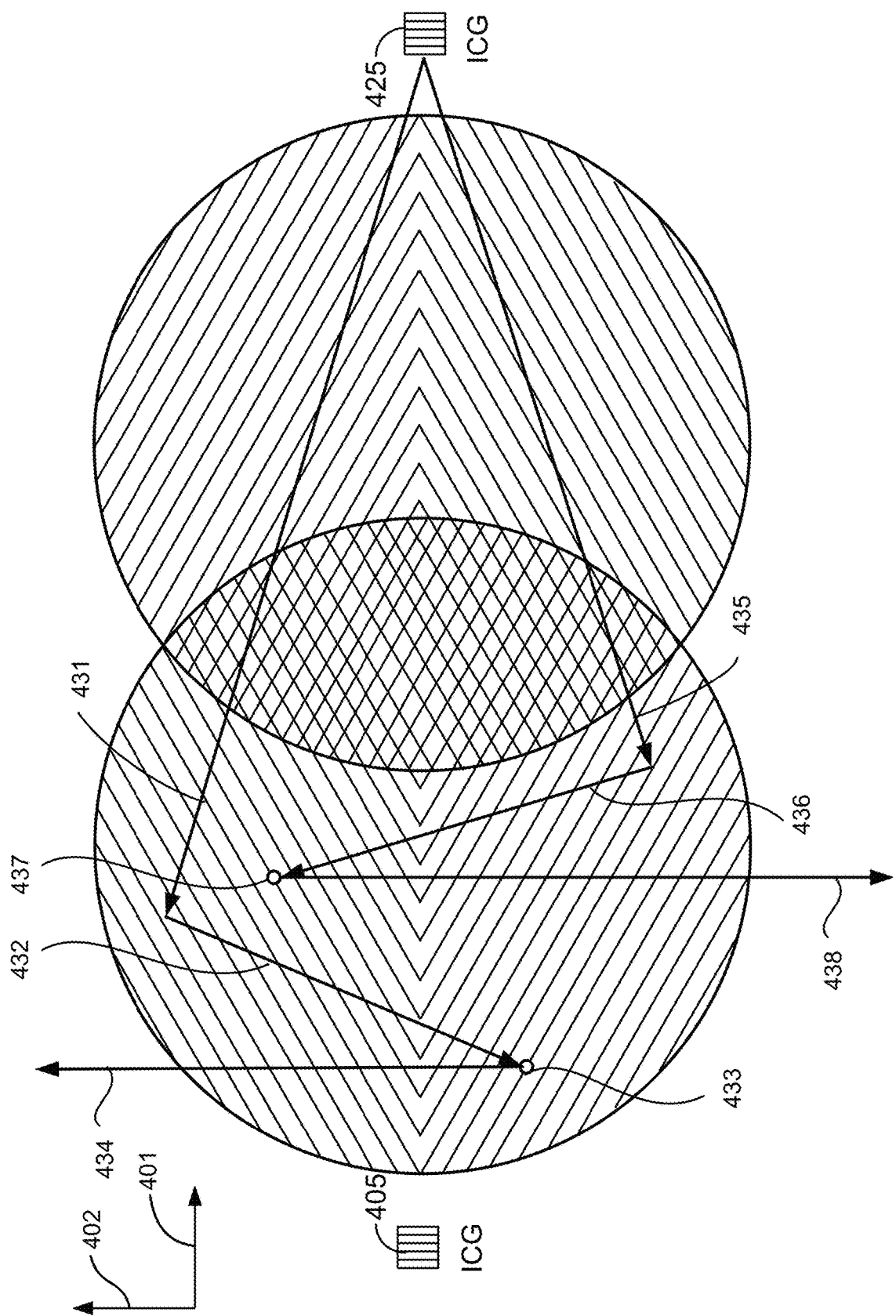
FIG. 4B is a simplified plan view diagram illustrating propagation of rays from a second projector in the multi-projector waveguide display illustrated in FIG. 4A.
Figure 4C:
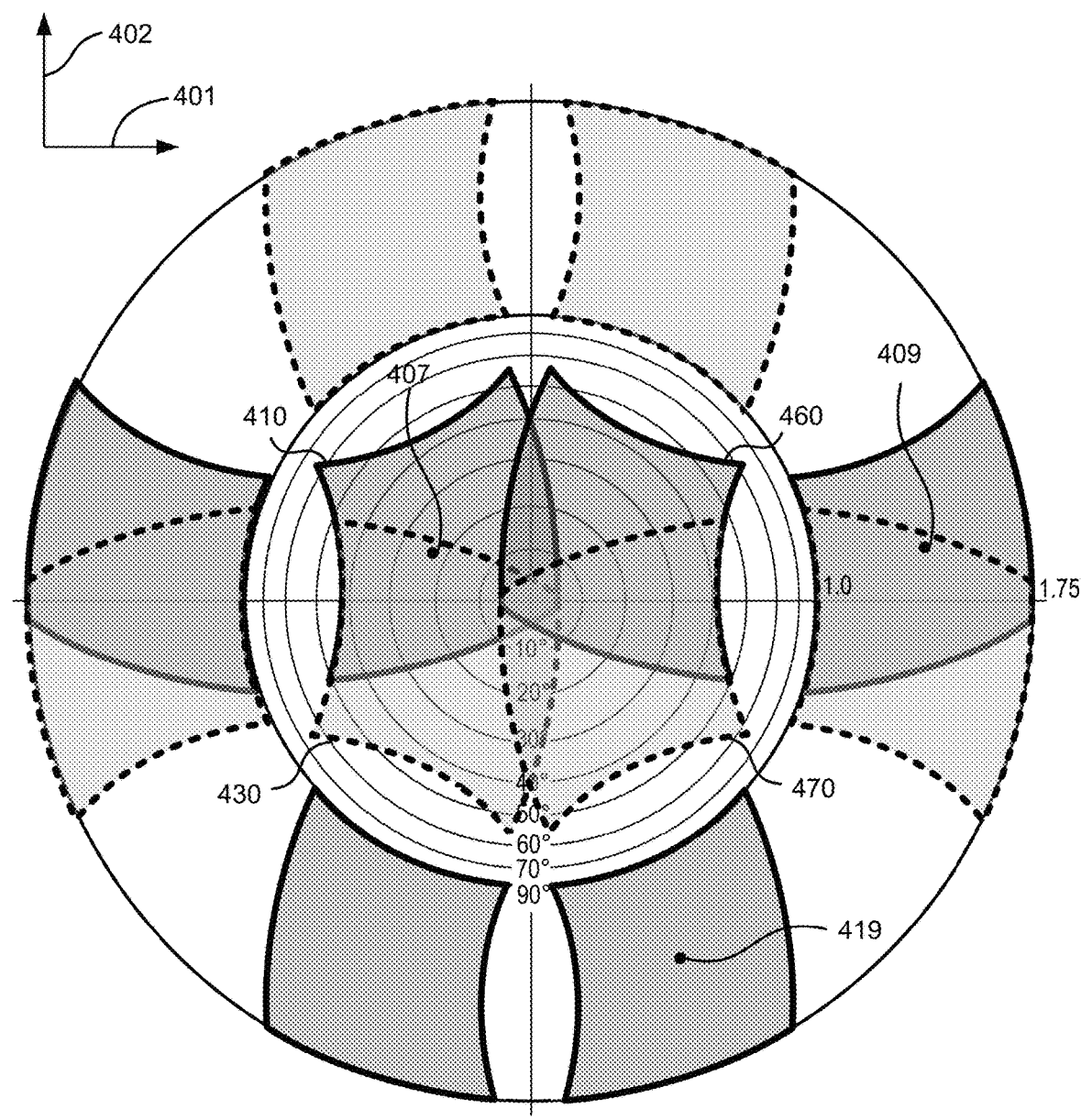
FIG. 4C is a simplified k-space diagram illustrating operation of the eyepiece waveguide illustrated in FIG. 4A.

FIG. 4B is a simplified plan view diagram illustrating propagation of rays from a second projector in the multi-projector waveguide display illustrated in FIG. 4A. As will be evident to one of skill in the art, the operation of the eyepiece waveguide discussed in relation to FIG. 4B will mirror, to some extent, the operation of the eyepiece waveguide as discussed in relation to FIG. 4A. Namely, diffraction of input light by ICG 425, which originates with a second projector (not shown), results in light diffracted into and propagating in the plane of the waveguide as illustrated by light rays 431 and 435. As will be described, light rays represented by light ray 431 and light rays represented by light ray 435 will result in the generation of a field of view that includes two portions, each associated with light rays initially propagating into the upper half of the eyepiece waveguide and the lower half of the eyepiece waveguide, respectively.

Light ray 431 propagates up and to the left after diffraction from ICG 425 and diffracts from gratings in the top portion of the waveguide, producing light ray 432, which propagates down and to the left. Light ray 432 propagates in the waveguide and diffracts from gratings in the lower portion of the waveguide, producing outcoupling event 433. Outcoupled light ray 434 is illustrated as propagating up toward the user from the lower portion of the waveguide, thereby producing a portion of the field of view associated with the lower portion of the user's field of view.

Concurrently, light ray 435 propagates down and to the left near axis 401 and diffracts from gratings in the lower portion of the waveguide near axis 401, producing light ray 436, which propagates up and to the left. Light ray 436 propagates in the waveguide and diffracts from gratings in the upper portion of the waveguide near axis 401, producing outcoupling event 437. Outcoupled light ray 438 is illustrated as propagating down toward the user from the upper portion of the waveguide near axis 401, thereby producing a lower portion of the field of view. As will be evident to one of skill in the art, rays incoupled at intermediate angles and operable to propagate in the waveguide will fill out the field of view. Referring to FIG. 4C, field of view 460 is produced by the light rays illustrated by light rays 431 and 435.

FIG. 4C is a simplified k-space diagram illustrating operation of the eyepiece waveguide illustrated in FIG. 4A. Referring to FIG. 4C, a combined field of view including four fields of view is formed by the overlap between field of view 410 and field of view 430, which are produced by light incident from a first projector, and field of view 460 and field of view 470, which are produced by light incident from a second projector.

As illustrated in FIG. 4C, each of the individual fields of view have a spatial extent of ~50° vertically by ~40° horizontally. By combining four individual fields of view in a combined field of view, the overlap between these fields of view results in a combined field of view characterized by a much larger extended field of view of ~80°×~100°. Thus, using embodiments of the present invention that utilize two projectors and gratings that are characterized by increased grating period in two dimensions, waveguide displays with an increased or extended field of view are enabled.

Referring to FIG. 4C, embodiments of the present invention provide displays with a tiled field of view that is formed by tiling multiple individual fields of view, with or without overlap between adjacent fields of view. As will be evident to one of skill in the art, in this embodiment of an eyepiece waveguide fabricated in a polymer with an index of 1.75, the annulus defined by the circle positioned at n=1.0 and the circle positioned at n=1.75 corresponds to the in-waveguide angles. It will be appreciated that embodiments of the present invention, in contrast with designs that utilize expensive and exotic materials such as sapphire and lithium niobate, provide eyepiece waveguides that can be fabricated in low cost, low weight, and robust low refractive index materials such as polymers while still providing a large field of view in a combined field of view design. Although some of the discussion herein is related to polymer materials, embodiments of the present invention are not limited to these materials and the concepts discussed herein are applicable to materials with indices of refraction greater than 1.75. In particular, the annulus having a boundary at n=1.75 is not intended to limit the scope of the present invention. One of ordinary skill in the art would recognize many variations, modifications, and alternatives.

The k-space diagram in FIG. 4C demonstrates that the eyepiece waveguide design illustrated in FIGS. 4A and 4B is characterized by an increased grating period along both axis 401 and axis 402 since the center of field of view 410 is translated by a distance along axis 401 and axis 402 that is greater than the distance from the origin to position 419 and from the origin to position 409. Thus, in the eyepiece waveguide design illustrated in FIGS. 4A and 4B and described by the k-space diagram in FIG. 4C, the translation in k-space corresponding to diffraction by the ICG is greater than the distance from the origin to the center of the annulus of in-waveguide angles. Namely, the distance in k-space from position 407 to position 409 (measured along axis 401) is greater than the distance in k-space from the origin to position 409 (measured along axis 401) (i.e., increased grating period along axis 401) and the distance in k-space from position 407 to position 419 (measured along axis 402) is greater than the distance in k-space from the origin to position 419 (measured along axis 402) (i.e., increased grating period along axis 402).

As described more fully in relation to FIG. 3G and illustrated in FIG. 4C, diffraction of light into and out of the eyepiece waveguide and propagation of light in the eyepiece waveguide result in several different translations of field of view 410, field of view 430, field of view 460, and field of view 470 in k-space. As illustrated in FIGS. 4A and 4C, light diffracted from ICG 405 will translate field of view 410 and field of view 430 to the right portion of the annulus of in-waveguide angles. OPE diffraction events will translate these fields of view into the lower right and upper right portions of the annulus of in-waveguide angles, respectively. Light diffracted from a grating line operating as an EPE event will translate these fields of view to the positions illustrated for field of view 410 and field of view 430 in the eye-space region of the k-space diagram.

As illustrated in FIGS. 4B and 4C, light diffracted from ICG 425 will translate field of view 460 and field of view 470 to the left portion of the annulus of in-waveguide angles. OPE diffraction events will translate these fields of view into the lower left and upper left portions of the annulus of in-waveguide angles, respectively. Light diffracted from a grating line operating as an EPE event will translate these fields of view to the positions illustrated for field of view 460 and field of view 470 in the eye-space region of the k-space diagram.

As illustrated in FIG. 4C, the centers of each of the fields of view are offset from the origin of the k-space diagram. As discussed herein, the use of gratings having increased period in both directions results in this vertical and horizontal offset. As a result, by using two projectors, one providing image light to a first ICG and one providing image light to a second ICG, an extended field of view can be created by the tiling of the individual fields of view, with the overlap between the individual fields of view being defined by the grating characteristics.

It should be noted that the description provided in relation to FIGS. 4A and 4B relates to the central ray that would be associated with the central pixel of the projected image frame. In addition, rays that are formed at the edges of the image frame can be analyzed using the formalism utilized above in relation to FIGS. 4A and 4B. These rays can be referred to as peripheral rays. As will be evident to one of skill in the art, propagation in the k-space diagram is inversely related to propagation in image space, with propagation in the upper portion of the k-space diagram corresponding to propagation in the lower portion of the image space. As illustrated in FIGS. 4A-4C, light rays outcoupled from the bottom portion the eyepiece waveguide along an upward direction will be directed toward the eyebox in a manner suitable for reaching the user's pupil when it is well-centered with respect to the eyepiece waveguide. Furthermore, light rays outcoupled from the top portion the eyepiece waveguide along a downward direction will be directed toward the eyebox in a manner suitable for reaching the user's pupil when it is well-centered with respect to the eyepiece waveguide. Accordingly, embodiments of the present invention provide efficient designs in which light is outcoupled in a manner that preferentially reaches the user's pupil when the pupil is well-centered in the eyebox.

By tracking peripheral rays that are associated with the top of the field of view, the bottom of the field of view, and the sides of the field of view of each image frame, the inventors have demonstrated that the rays that correspond to the bottom of the field of view are outcoupled efficiently at the bottom of the eyepiece waveguide, with reduced or minimal outcoupling at the top of the eyepiece waveguide. Accordingly, light efficiency in reaching the eyebox and the pupil of the user's eye is increased by embodiments of the present invention since the outcoupling events are increased and/or maximized for light from the projector providing light to ICG 405 that is outcoupled from the bottom of the eyepiece waveguide along an upward direction that is directed toward the eyebox and outcoupling events are increased and/or maximized for light from the projector providing light to ICG 425 that is outcoupled from the top of the eyepiece waveguide along a downward direction that is directed toward the eyebox.

Figure 4D:
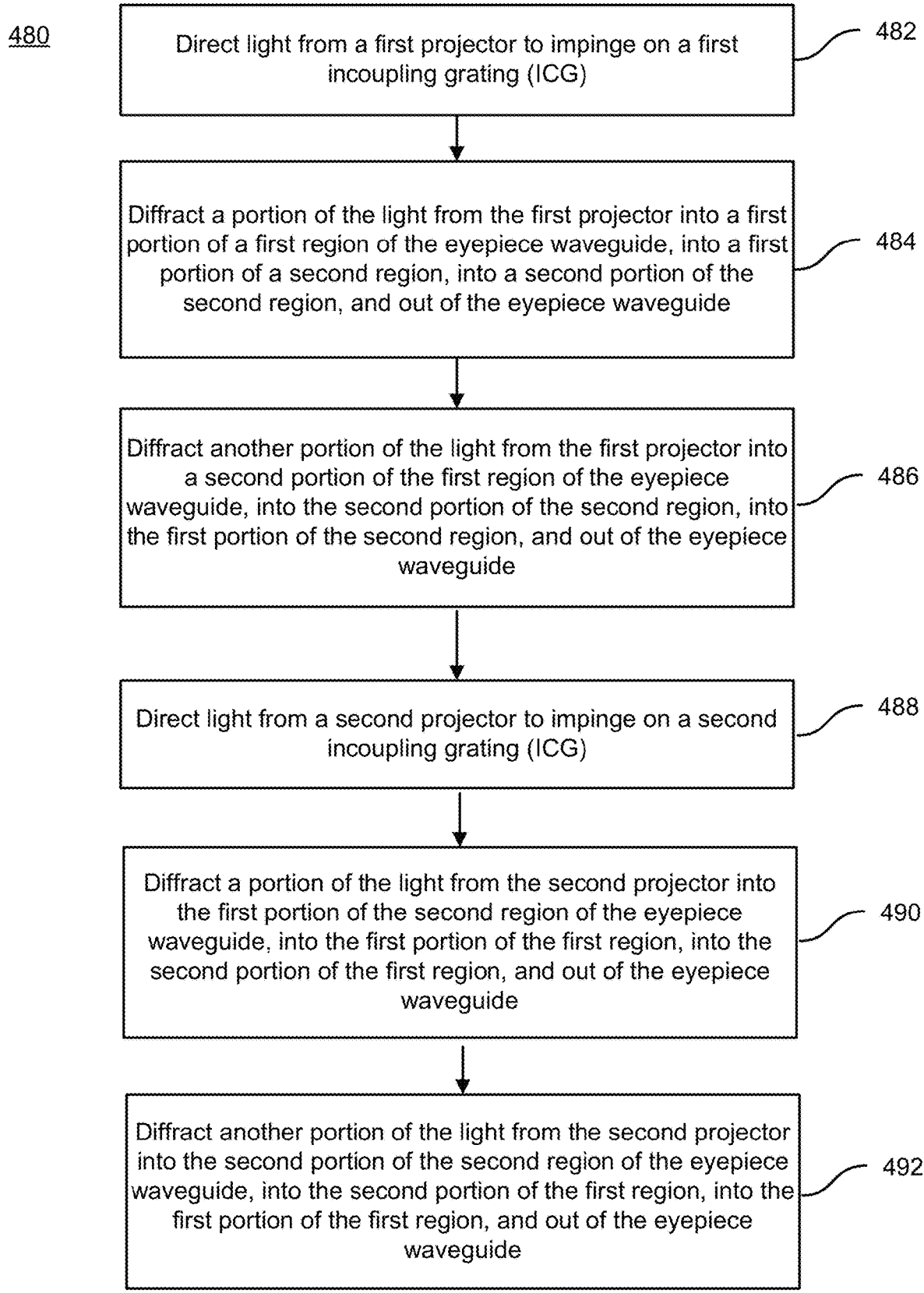
FIG. 4D is a simplified flowchart illustrating a method of operating an eyepiece waveguide defined by a first region and a second region according to an embodiment of the present invention.

FIG. 4D is a simplified flowchart illustrating a method of operating an eyepiece waveguide defined by a first region and a second region according to an embodiment of the present invention. The method illustrated in FIG. 4D can be implemented in the context of the multi-projector waveguide display utilizing an eyepiece waveguide illustrated in FIGS. 4A and 4B. The method 480 includes directing light from a first projector to impinge on a first incoupling grating (ICG) (482). The first projector, illustrated as projector 621 in FIG. 6A, can project light that impinges on first ICG illustrated as ICG 405 in FIG. 4A or ICG 620 in FIG. 6A.

Light incident on the first ICG is diffracted into the plane of the eyepiece waveguide and a fraction of the light from the first projector is diffracted into a first portion of the first region of the eyepiece waveguide, into a first portion of the second region, into a second portion of the second region, and out of the eyepiece waveguide (484). Referring to FIG. 4A, light diffracted into the first portion of the first region 403 of the eyepiece waveguide passes into the first portion of the second region 404 without diffraction, whereas, in FIG. 6A, light diffracted into the first portion 602 of the first region 601 of the eyepiece waveguide is diffracted in the plane of the eyepiece waveguide toward the first portion 605 of the second region 604. Thus, in some embodiments, the first portion of the first region of the eyepiece waveguide includes a first set of diffractive optical elements, e.g., a first set of gratings that are blazed and characterized by decreased outcoupling efficiency for light from the first projector.

As light propagates in the first portion of the second region of the eyepiece waveguide, diffraction from diffractive optical elements, e.g., gratings, results in redirection of the light toward the second portion of the second region 404, illustrated by light ray 412 in FIG. 4A. The gratings in the first portion of the second region can be oriented at ~150° to the axis passing between ICG 405 and ICG 425. Additionally, light ray 412 illustrated in FIG. 4A propagates in the waveguide and diffracts from gratings in the second portion of the second region, producing outcoupling out of the eyepiece waveguide. The gratings in the second portion of the second region can be oriented at ~−150° to the axis passing between ICG 405 and ICG 425. As described in relation to FIG. 4A, the outcoupled light ray propagates up toward the user from the second portion of the second region of the waveguide, thereby producing a portion of the field of view associated with the lower portion of the user's field of view.

Another fraction of the light from the first projector is diffracted into the second portion of the first region of the eyepiece waveguide, into the second portion of the second region, into the first portion of the second region, and out of the eyepiece waveguide (486). Referring to FIG. 4A, light diffracted into the second portion of the first region 403 of the eyepiece waveguide passes into the second portion of the second region 404 without diffraction, whereas, in other embodiments, light diffracted into the second portion of the first region of the eyepiece waveguide is diffracted in the plane of the eyepiece waveguide toward the second portion of the second region. Thus, in some embodiments, the second portion of the first region of the eyepiece waveguide includes a second set of diffractive optical elements, e.g., a second set of gratings that are blazed and characterized by decreased outcoupling efficiency for light from the first projector.

As light propagates in the second portion of the second region of the eyepiece waveguide, diffraction from diffractive optical elements, e.g., gratings, results in redirection of the light toward the first portion of the second region 404, illustrated by light ray 416 in FIG. 4A. The gratings in the first portion of the first region can be oriented at ~30° to the axis passing between ICG 405 and ICG 425. Additionally, light ray 416 illustrated in FIG. 4A propagates in the waveguide and diffracts from gratings in the first portion of the second region 404, producing outcoupling out of the eyepiece waveguide. The gratings in the second portion of the first region can be oriented at ~−30° to the axis passing between ICG 405 and ICG 425. As described in relation to FIG. 4A, the outcoupled light ray propagates down toward the user from the first portion of the second region of the waveguide, thereby producing a portion of the field of view associated with the upper portion of the user's field of view.

The method also includes directing light from a second projector to impinge on a second incoupling grating (ICG) (488). The second projector, illustrated as second projector 626 in FIG. 6A, can project light that impinges on second ICG illustrated as ICG 425 in FIG. 4A or ICG 625 in FIG. 6A.

Light incident on the second ICG is diffracted into the plane of the eyepiece waveguide and a fraction of the light from the second projector is diffracted into a first portion of the second region of the eyepiece waveguide, into the first portion of the first region, into a second portion of the first region, and out of the eyepiece waveguide (490). Referring to FIG. 4B, light diffracted into the first portion of the second region 404 of the eyepiece waveguide passes into the first portion of the first region 403 without diffraction, whereas, in other embodiments, light diffracted into the first portion of the second region of the eyepiece waveguide is diffracted in the plane of the eyepiece waveguide toward the first portion of the first region. Thus, in some embodiments, the first portion of the second region of the eyepiece waveguide includes a third set of diffractive optical elements, e.g., a third set of gratings that are blazed and characterized by decreased outcoupling efficiency for light from the second projector.

As light propagates in the first portion of the first region of the eyepiece waveguide, diffraction from diffractive optical elements, e.g., gratings, results in redirection of the light toward the second portion of the first region, illustrated by light ray 432 in FIG. 4B. The gratings in the first portion of the first region can be oriented at ~30° to the axis passing between ICG 405 and ICG 425. Additionally, light ray 432 illustrated in FIG. 4B propagates in the waveguide and diffracts from gratings in the second portion of the first region, producing outcoupling out of the eyepiece waveguide. The gratings in the second portion of the first region can be oriented at ~−30° to the axis passing between ICG 405 and ICG 425. As described in relation to FIG. 4B, the outcoupled light ray propagates up toward the user from the second portion of the first region of the waveguide, thereby producing a portion of the field of view associated with the lower portion of the user's field of view.

Another fraction of the light from the second projector is diffracted into the second portion of the second region of the eyepiece waveguide, into the second portion of the first region, into the first portion of the first region, and out of the eyepiece waveguide (492). Referring to FIG. 4B, light diffracted into the second portion of the second region of the eyepiece waveguide passes into the second portion of the first region without diffraction, whereas, in other embodiments, light diffracted into the second portion of the second region of the eyepiece waveguide is diffracted in the plane of the eyepiece waveguide toward the second portion of the first region. Thus, in some embodiments, the second portion of the second region of the eyepiece waveguide includes a fourth set of diffractive optical elements, e.g., a fourth set of gratings that are blazed and characterized by decreased outcoupling efficiency for light from the second projector.

As light propagates in the second portion of the first region of the eyepiece waveguide, diffraction from diffractive optical elements, e.g., gratings, results in redirection of the light toward the first portion of the first region, illustrated by light ray 436 in FIG. 4B. The gratings in the second portion of the first region can be oriented at ~−30° to the axis passing between ICG 405 and ICG 425. Additionally, light ray 436 illustrated in FIG. 4B propagates in the waveguide and diffracts from gratings in the first portion of the first region, producing outcoupling out of the eyepiece waveguide. The gratings in the first portion of the first region can be oriented at ~30° to the axis passing between ICG 405 and ICG 425. As described in relation to FIG. 4B, the outcoupled light ray propagates down toward the user from the first portion of the first region of the waveguide, thereby producing a portion of the field of view associated with the upper portion of the user's field of view.

In some embodiments, the light from the first projector impinges on the first ICG at a first non-zero angle of incidence and the light from the second projector impinges on the second ICG at a second non-zero angle of incidence equal to zero minus the first non-zero angle of incidence. In these embodiments, a first field of view of the first portion of the second region is centered at the non-zero angle of incidence and a second field of view of the first portion of the first region is centered at the non-zero angle of incidence.

It should be appreciated that the specific steps illustrated in FIG. 4D provide a particular method of operating an eyepiece waveguide defined by a first region and a second region according to an embodiment of the present invention. Other sequences of steps may also be performed according to alternative embodiments. For example, alternative embodiments of the present invention may perform the steps outlined above in a different order. Moreover, the individual steps illustrated in FIG. 4D may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 5A:
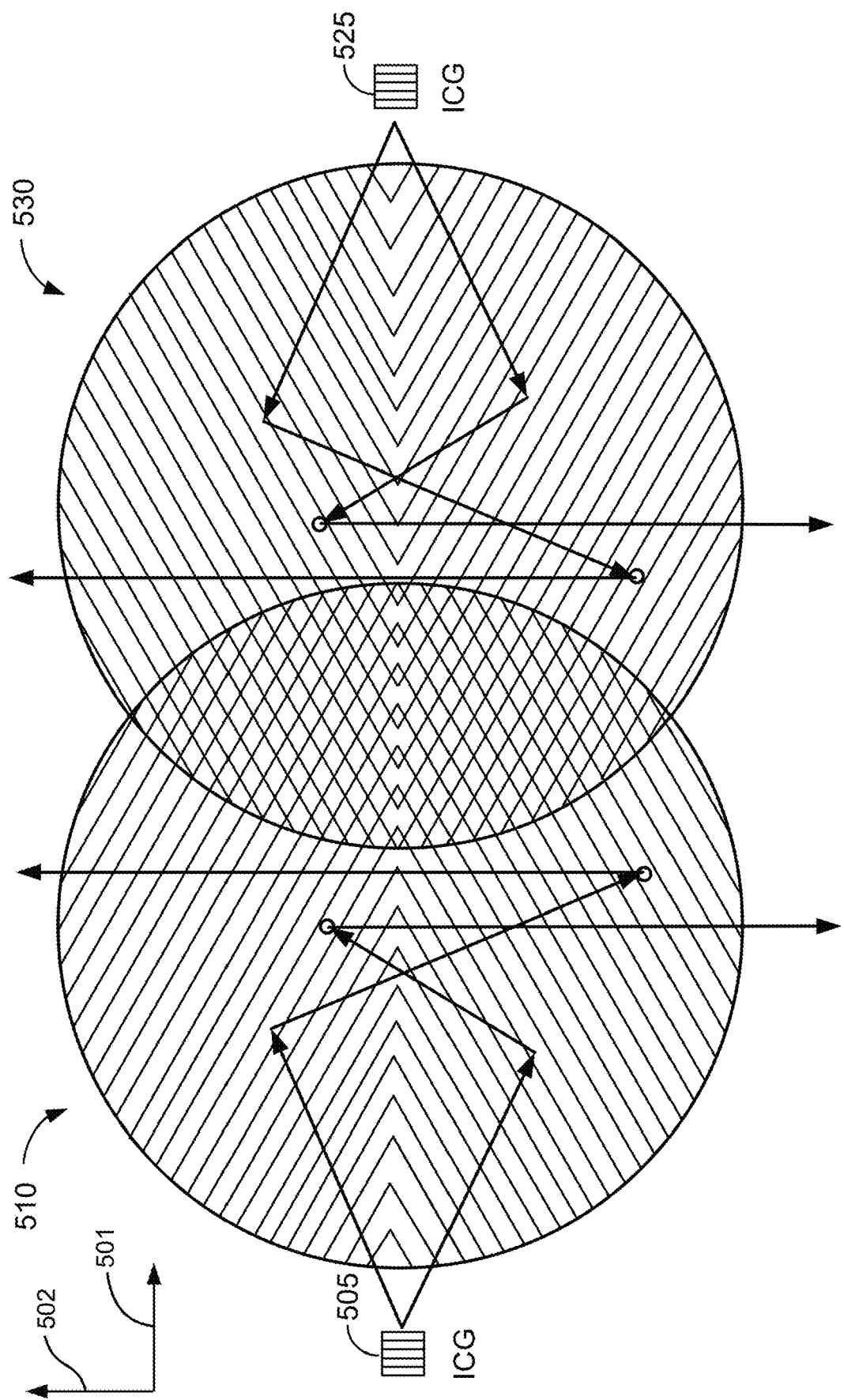
FIG. 5A is a simplified plan view diagram illustrating a multi-projector waveguide display utilizing an eyepiece waveguide with decreased grating period according to an embodiment of the present invention.

FIG. 5A is a simplified plan view diagram illustrating a multi-projector waveguide display utilizing an eyepiece waveguide with decreased grating period according to an embodiment of the present invention. The description provided in relation to FIGS. 4A-4C is applicable to FIGS. 5A-5C, but for eyepiece waveguides with decreased grating period.

In this design in which the grating period is decreased by increasing the grating pitch, light is outcoupled after propagating a reduced distance along the eyepiece waveguide. Referring to FIG. 5A, light incident on ICG 505 is outcoupled in field of view 510 of the eyepiece waveguide adjacent ICG 505. Similarly, light incident on ICG 525 is outcoupled in field of view 530 of the eyepiece waveguide adjacent ICG 525.

Figure 5B:
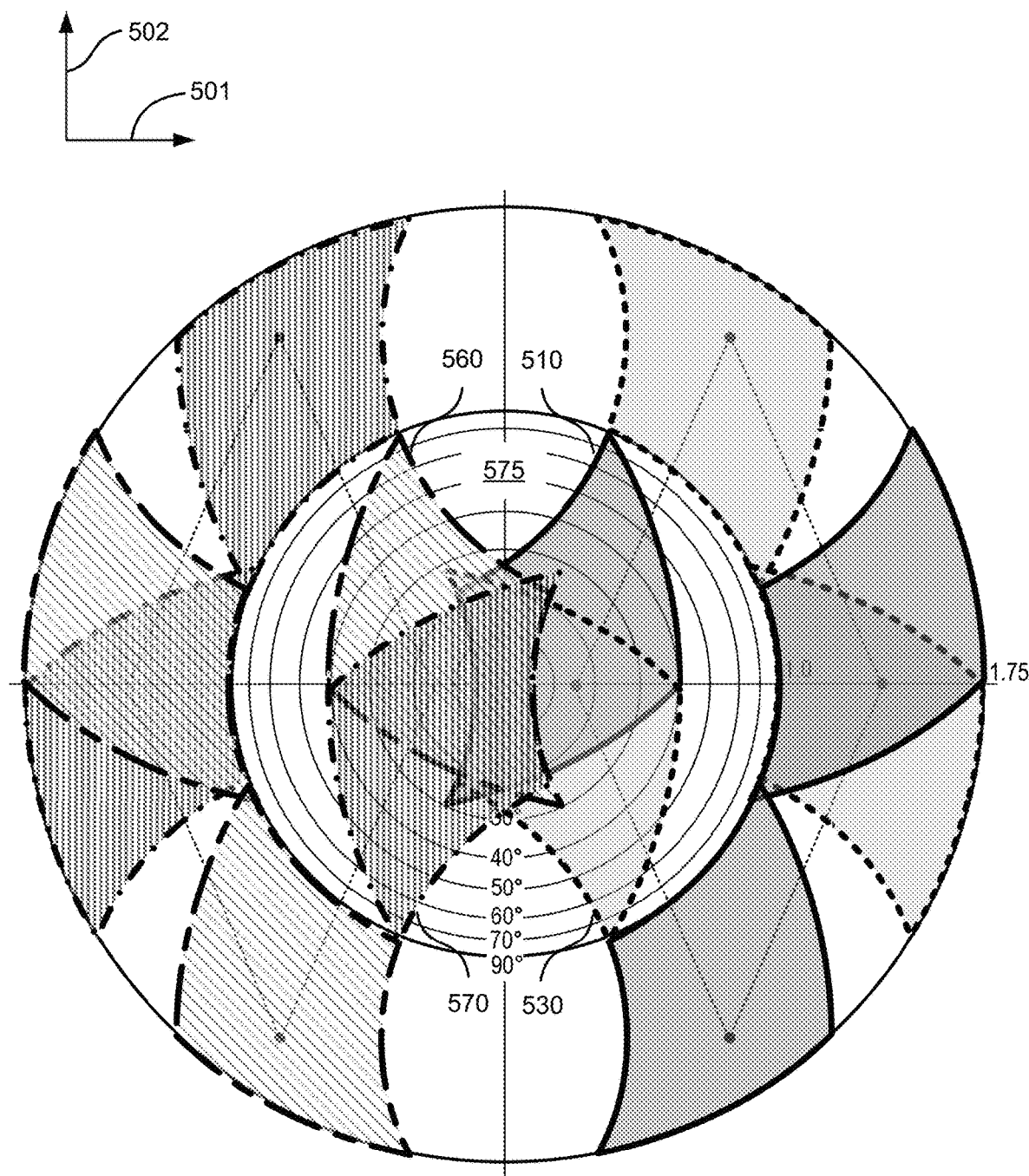
FIG. 5B is a simplified k-space diagram illustrating operation of the eyepiece waveguide illustrated in FIG. 5A.

FIG. 5B is a simplified k-space diagram illustrating operation of the eyepiece waveguide illustrated in FIG. 5A.

The k-space diagram in FIG. 5B demonstrates that the eyepiece waveguide design illustrated in FIG. 5A is a design characterized by a decreased grating period along axis 501 and an increased grating period along axis 502. The decreased grating period along axis 501 is illustrated by the center of field of view 510/560 being translated by a distance along axis 501 that is less than the distance from the origin to the center of the annulus of in-waveguide angles. Similarly, the center of field of view 530/570 is translated by a distance along axis 501 that is less than the distance from the origin to the center of the annulus of in-waveguide angles. In the vertical direction aligned with axis 502, behavior similar to that discussed above in relation to FIG. 4C is demonstrated. Accordingly, the center of field of view 510/560 is translated by a distance along axis 502 that is greater than the distance from the origin to the center of the annulus of in-waveguide angles. Similarly, the center of field of view 530/570 is translated by a distance along axis 501 that is greater than the distance from the origin to the center of the annulus of in-waveguide angles.

As illustrated in FIG. 5B, the field of view achieved using the eyepiece waveguide design illustrated in FIG. 5A can reach a field of view along a first direction of ~50° to about ~180° at the furthest extent by ~50° in a second direction orthogonal to the first direction. It should be noted that the combination of fields of view 510 and 560 in the upper portion of the k-space diagram and fields of view 530 and 570 in the lower portion of the k-space diagram result in a notch in region 575 that may be masked as appropriate to the particular application.

Figure 6A:
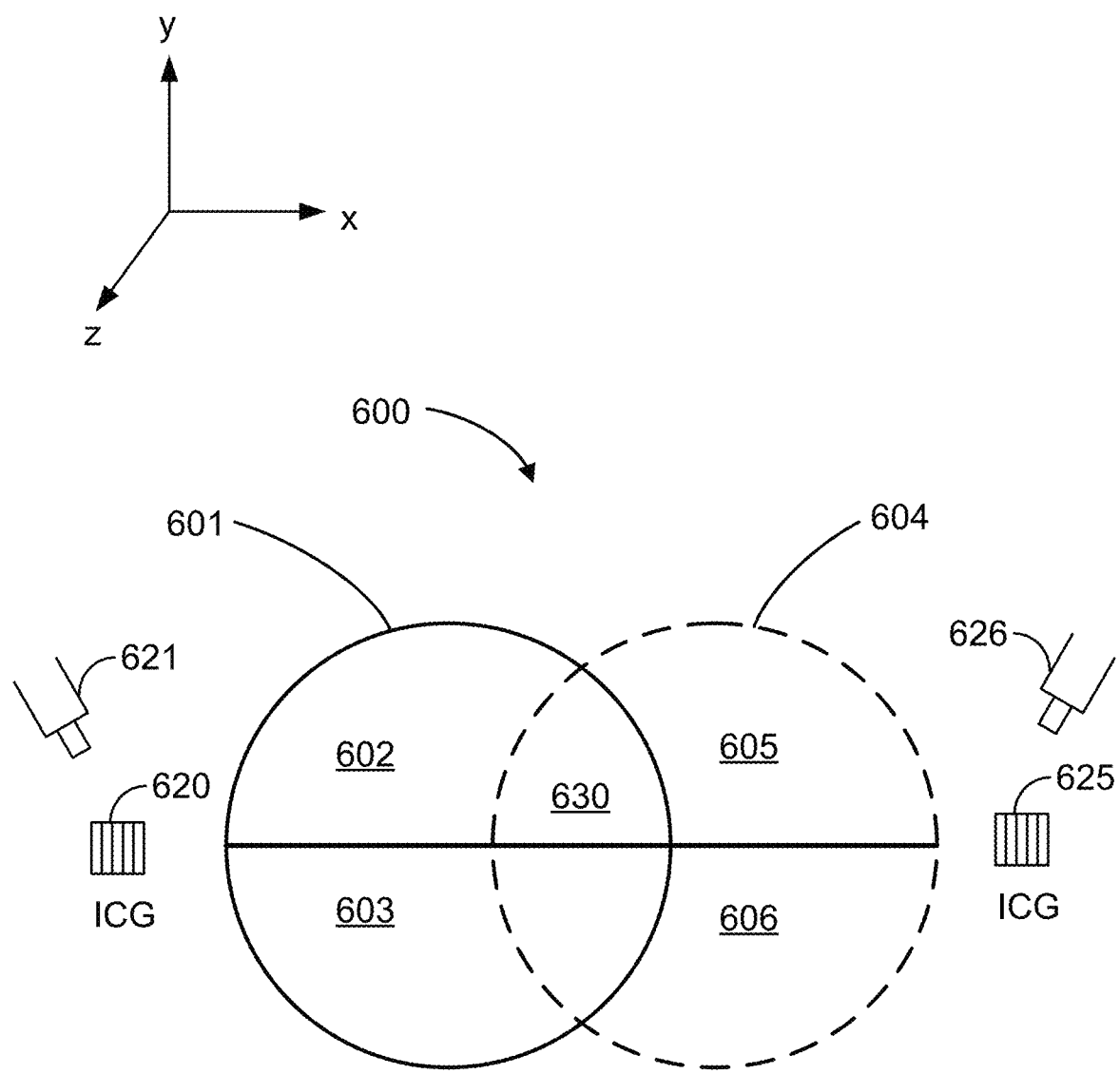
FIG. 6A is a simplified plan view illustrating elements of a multi-projector waveguide display according to an embodiment of the present invention.

FIG. 6A is a simplified plan view illustrating elements of a multi-projector waveguide display according to an embodiment of the present invention. As illustrated in FIG. 6A and described more fully below, eyepiece waveguide 600, which can also be referred to as a waveguide display component, includes ICG 620, which can be referred to as a first ICG. ICG 620 is operable to receive input light from first projector 621. As discussed in relation to FIG. 1, ICG 620 receives input light propagating along a direction having a component aligned with the z-axis, i.e., normal to the input surface of eyepiece waveguide 600, which lies in the x-y plane, and couples at least a portion of the input light into the waveguide.

Eyepiece waveguide 600 also includes ICG 625, which can be referred to as a second ICG. ICG 625 is operable to receive input light from second projector 626. As discussed in relation to FIG. 1, ICG 620 receives input light propagating along a direction having a component aligned with the z-axis, i.e., normal to the input surface of eyepiece waveguide 600, which lies in the x-y plane, and couples at least a portion of the input light into the waveguide.

ICG 620 and ICG 625 are disposed along the x-axis, which lies in the plane of the eyepiece waveguide. Referring to FIG. 6A, waveguide display 600 further includes multiple regions in which light is diffracted in the plane of the waveguide display as well as out of the plane of the waveguide display. These multiple regions include first region 601 and second region 604. In each region, the grating lines or other diffractive structures present in the portions of the region are oriented at a predetermined angle with respect to other grating lines present in other portions of the region or with respect to grating lines in the other region (or others of multiple regions).

Figure 6B:
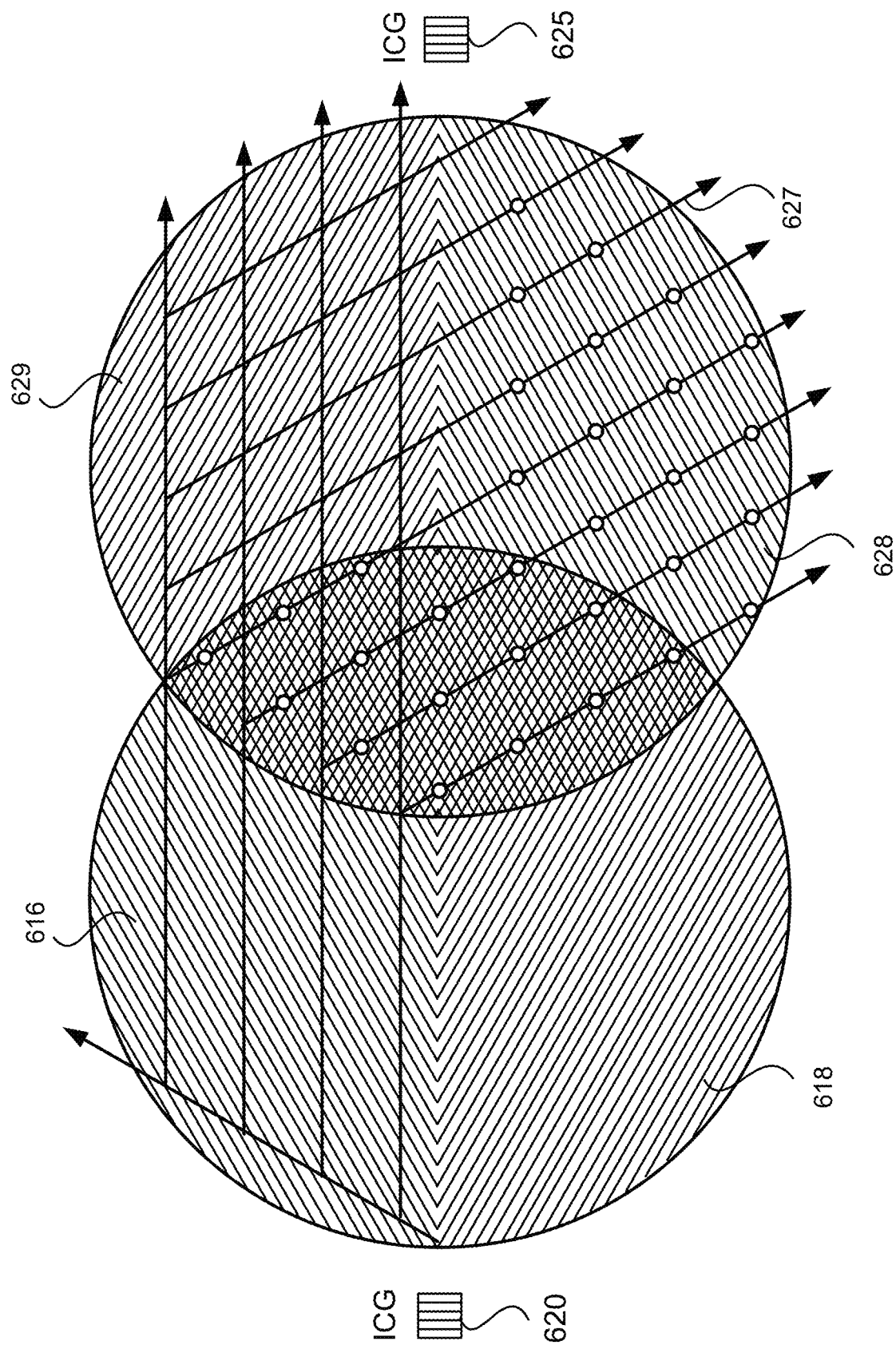
FIG. 6B is a simplified plan view diagram illustrating propagation of light rays in a multi-projector waveguide display according to an embodiment of the present invention.

It should be noted that in the two projector designs illustrated in FIGS. 6A and 6B gratings in a portion of a region can perform different diffractive functions depending on the source of the light incident on the gratings. As an example, light incident on ICG 620, when propagating in second portion 606 of second region 604, can interact with gratings in second portion 606 to outcouple from the eyepiece waveguide. That is, gratings in second portion 606 can function as EPE gratings for light from projector 621. In contrast, light incident on ICG 625, when propagating in second portion 606 of second region 604, can interact with gratings in second portion 606 to diffract in the plane of the eyepiece waveguide toward first portion 605. That is, gratings in second portion 606 can function as OPE gratings for light from second projector 626. Similar diverse effects will be evident for other gratings in other portions, resulting in different functionality (i.e., OPE or EPE functionality) depending on the source of the light propagating in the eyepiece waveguide. One of ordinary skill in the art would recognize many variations, modifications, and alternatives.

In contrast with the areas of second portion 606 having only a single set of gratings, the overlap region 630 between first region 601 and second region 604 will produce multiple effects, for example, both EPE and OPE effects. Because multiple sets of gratings are present, diffraction effects will be produced for light incident from both projectors.

The actual implementation used to provide gratings in first portion 602 and second portion 603 of first region 601 and first portion 605 and second portion 606 of second region 604 can be varied. As an example, gratings in second portion 603 of first region 601 and first portion 605 of second region 604 (i.e., the gratings oriented at −30° to the x-axis) can be formed on a first surface of the substrate used to fabricate the eyepiece waveguide and gratings in first portion 602 of first region 601 and second portion 606 of second region 604 (i.e., the gratings oriented at 30° to the x-axis) can be formed on a second surface of the substrate opposing the first surface. Thus, overlap region 630 can be formed from gratings present on both surfaces of the eyepiece waveguide.

FIG. 6B is a simplified plan view diagram illustrating propagation of light rays in a multi-projector waveguide display according to an embodiment of the present invention.

Referring to FIGS. 6A and 6B, first region 601 includes a first portion 602, also referred to as an upper portion or a top portion, that is characterized by grating lines 616 oriented at an angle of ~30° to the x-axis, along which ICG 620 and ICG 625 lie. First region 601 also includes a second portion 603, also referred to as a lower portion or a bottom portion, that is characterized by grating lines 618 oriented at an angle of ~−30° to the x-axis. As a result, grating lines 616 and grating lines 618 are oriented at an angle of ~60° to each other. As will be evident to one of skill in the art, the spacing between grating lines 616 and 618 is not drawn to scale for purposes of clarity.

Second region 604 includes a first portion 605, also referred to as an upper portion or a top portion, that is characterized by grating lines 629 oriented at an angle of ~120° to the x-axis. Second region 604 also includes a second portion 606, also referred to as a lower portion or a bottom portion, that is characterized by grating lines 628 oriented at an angle of ~−120° to the x-axis. As a result and in a manner similar to first region 601, grating lines 629 and grating lines 628 in second region 604 are oriented at an angle of ~60° to each other. As will be evident to one of skill in the art, the spacing between grating lines 629 and 628 is not drawn to scale for purposes of clarity.

In overlap region 630, grating lines 616 overlap with grating lines 629 and grating lines 618 overlap with grating lines 628. Thus, in addition to portions including a single set of grating lines, overlap region 630 includes multiple sets of overlapping grating lines and can be referred to as an intersection region. This overlap region enables a designer to implement a design with a larger exit pupil and balance efficiency of operation of the eyepiece waveguide with increases in exit pupil size, which is more tolerant of motion of the user's eye pupil.

Although grating lines 616 in first portion 602 of first region 601 and grating lines 618 in second portion 603 of first region 601 are illustrated as intersecting at the x-axis with no overlap of grating lines 616 in the second portion 603 and grating lines 618 in the first portion 602, this is not required by embodiments of the present invention. In some embodiments, grating lines 616 extend into second portion 603 and grating lines 618 extend into first portion 602.

As described more fully herein, the presence of the grating lines in the different portions of first region 601 and second region 604, including overlap of the grating lines in overlap region 630, enables the grating lines to function as an orthogonal pupil expander (OPE), diffracting light propagating in the plane of the eyepiece waveguide into new propagating directions and expanding the lateral dimension of light propagating in the eyepiece waveguide, as well as an exit pupil expander (EPE), diffracting light propagating in the plane of the eyepiece waveguide out of the plane of the eyepiece waveguide. Of particular note is that, depending on the direction in which light is propagating in the eyepiece waveguide, a set of grating lines can function as either an OPE or an EPE. As an example, for a given set of grating lines, light propagating in a first direction can be diffracted in the plane of the eyepiece waveguide (OPE functionality) while light propagating in a second direction orthogonal to the first direction can be diffracted out of the plane of the eyepiece waveguide (EPE functionality).

Referring to FIGS. 6A and 6B, as light propagates through first portion 602 of first region 601, interaction with grating lines 616 results in diffraction in the plane of the eyepiece waveguide along the direction of the axis between the ICGs. As a result of this diffraction, analogous to OPE diffraction, multiple copies of the first copy of the image are formed and propagate in the direction aligned with this axis.

Light propagating from first portion 602 to overlap region 630, because of the presence of grating lines oriented at of ~30° to the x-axis as well as grating lines oriented at ~120° to the x-axis, experiences diffraction in multiple directions in the plane of the eyepiece waveguide as well as out of the plane of the eyepiece waveguide. Light propagating in the direction aligned with the x-axis will encounter grating lines 629 and will diffract along the direction illustrated by arrow 627 in the plane of the eyepiece waveguide. As the light propagates along this direction, the light will encounter grating lines 628 and will experience an outcoupling event from the eyepiece waveguide. These outcoupling events are illustrated in FIG. 6B by open circles.

Referring to first portion 605, light propagating in the direction aligned with the x-axis passes through overlap region 630, encounters grating lines 629, and diffracts along the direction of arrow 627 in the plane of the eyepiece waveguide. Laddering of the light during these diffraction events will occur as appropriate to OPE functionality. As the light propagates further along the direction of arrow 627, the light will enter second portion 606, encounter grating lines 628, and experience additional outcoupling events from the eyepiece waveguide. These outcoupling events, like the outcoupling events produced in overlap region 630, are illustrated in FIG. 6B by open circles.

Thus, light entering the eyepiece waveguide at ICG 620 and generated by a first projector 621 can be outcoupled in second region 604. In the design illustrated in FIGS. 6A and 6B, light coupled into the eyepiece waveguide at ICG 620 preferably passes through first region 601 without experiencing outcoupling events, thereby resulting in little to no light loss by outcoupling, with passage through first region 601 only resulting in diffraction in the plane of the eyepiece waveguide, replicating OPE functionality. As a result, all outcoupling events for light from the first projector are preferably experienced in second region 604, which provides an output that forms one of the sub-displays of the combined display. Because, as illustrated in FIG. 2B, the cone of light rays entering the ICG was centered at a non-normal angle of incidence, the cone of light rays outcoupled in second region 604 also propagates at a non-normal angle of incidence, enabling spatial separation between the sub-displays and tiling of the combined display.

In addition to light entering ICG 620, light entering ICG 625 will undergo similar interactions as it propagates through second region 604, resulting in OPE interactions, and experiencing EPE interactions in first region 601. One of ordinary skill in the art would recognize many variations, modifications, and alternatives.

Figure 7A:
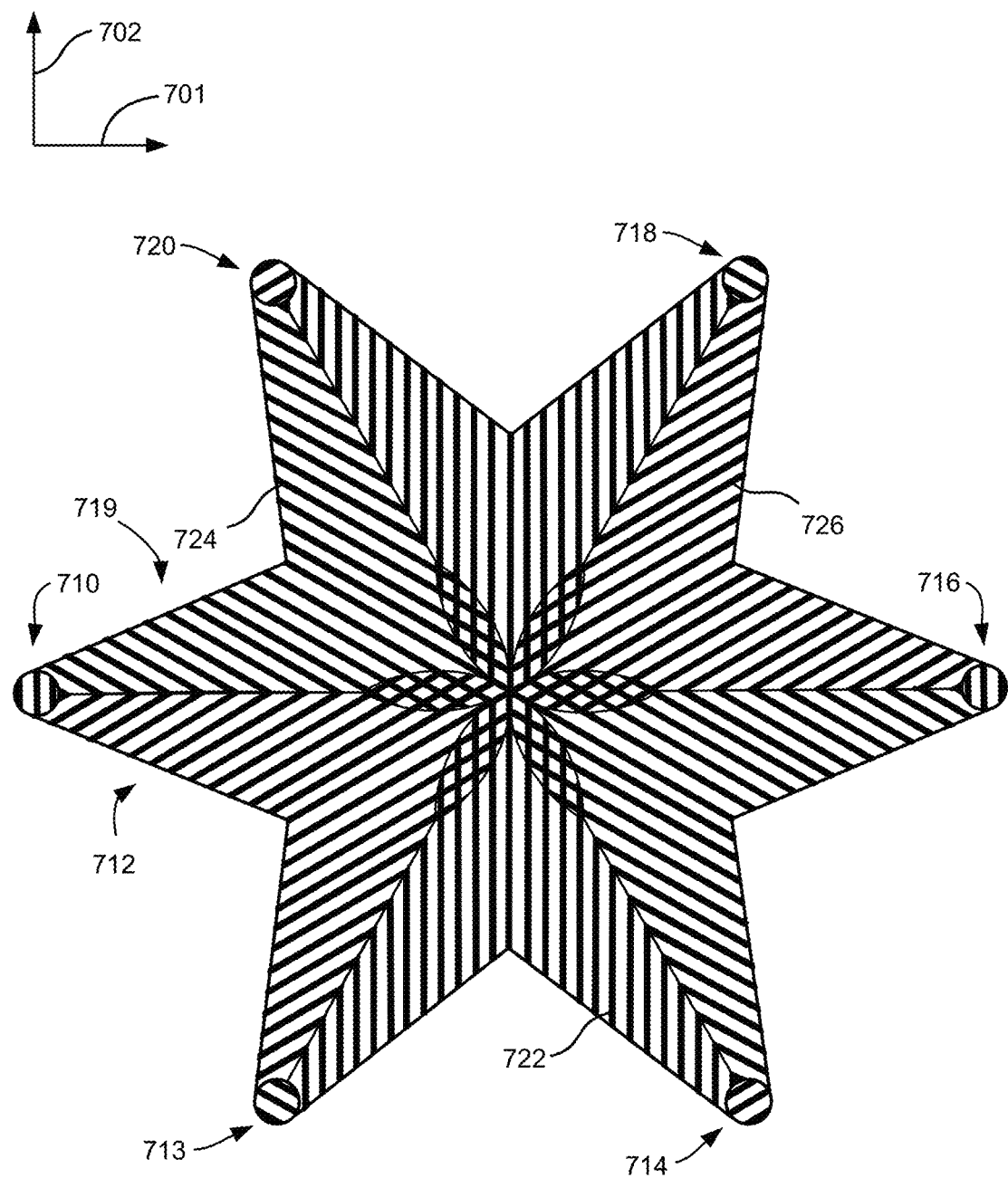
FIG. 7A is a simplified plan view diagram illustrating a six-projector waveguide display according to an embodiment of the present invention.

FIG. 7A is a simplified plan view diagram illustrating a six-projector waveguide display according to an embodiment of the present invention. In the six-projector design illustrated in FIG. 7A, six projectors are disposed at 60° angles around the periphery of the eyepiece waveguide. The six-projector waveguide display illustrated in FIG. 7A is a design utilizing a decreased grating period.

Light from six projectors (not shown) is coupled into a shared eyepiece waveguide region via ICGs 710, 713, 714, 716, 718, and 720. The shared eyepiece waveguide region includes three different grating vectors including grating vector 722 aligned with an axis passing through a perpendicular bisector of the line connecting ICGs 713 and 714 and a perpendicular bisector of the line connecting ICGs 718 and 720, i.e., vertically oriented axis 702, grating vector 724 aligned with an axis passing through a perpendicular bisector of the line connecting ICGs 710 and 720 and a perpendicular bisector of the line connecting ICGs 714 and 716, i.e., an axis oriented at −30° to vertical axis 702, and grating vector 726 aligned with an axis passing through a perpendicular bisector of the line connecting ICGs 716 and 718 and a perpendicular bisector of the line connecting ICGs 710 and 713, i.e., an axis oriented at +30° to vertical axis 702.

Referring to ICG 710, light incoupled via ICG 710 propagates in regions 712 and 719 along directions having a component aligned with axis 701. Regions 712 and 719 utilize a design similar to that shown in FIG. 5A, i.e., a chevron design in which gratings in region 712 are tilted at an angle of −120° to horizontal axis 701 and gratings in region 719 are tilted at an angle of 120° to horizontal axis 701. Light associated with the bottom of the field of view propagates through region 719, experiences diffraction toward region 712 (e.g., with little to no outcoupling), and is outcoupled from region 712. Similarly, light associated with the top of the field of view propagates through region 712, experiences diffraction toward region 719 (e.g., with little to no outcoupling), and is outcoupled from region 719. Additional description related to these interactions is provided in relation to FIG. 7B.

Utilizing the six-projector design illustrated in FIG. 7A, including six incoupling gratings and a shared eyepiece waveguide region, a combined, conical field of view of ~100° is achieved in a polymer eyepiece having an index of refraction of ~1.75.

Figure 7B:
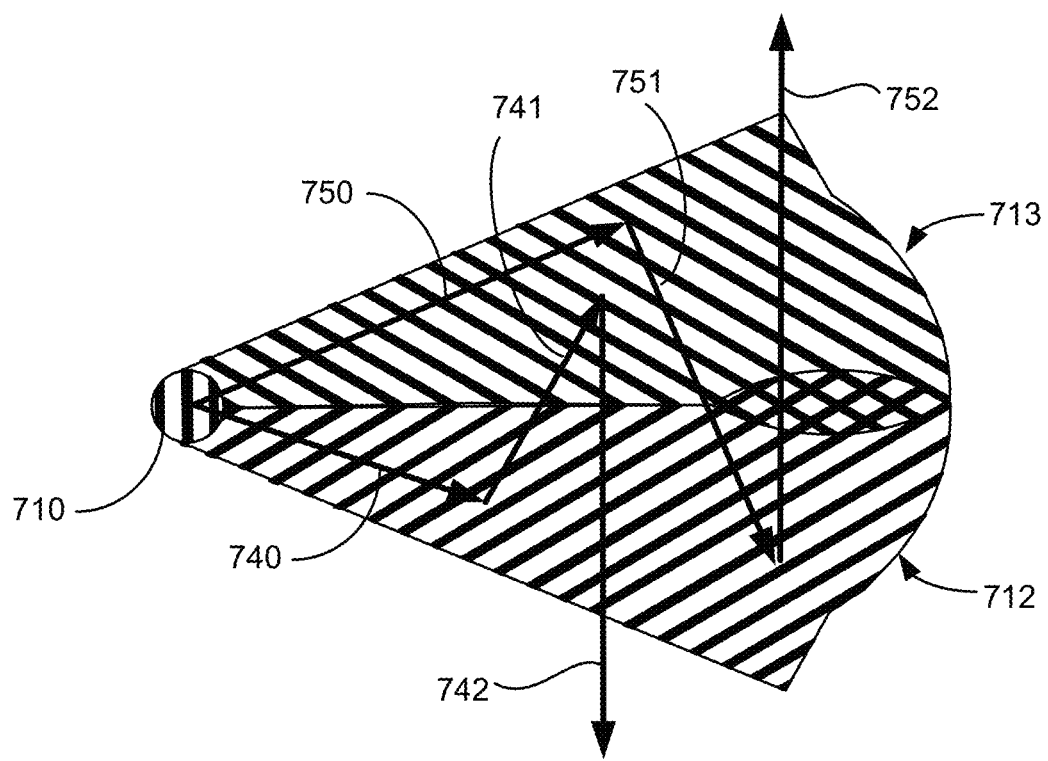
FIG. 7B is a simplified plan view diagram illustrating a single projector element of the six-projector waveguide display illustrated in FIG. 7A.
Figure 7C:
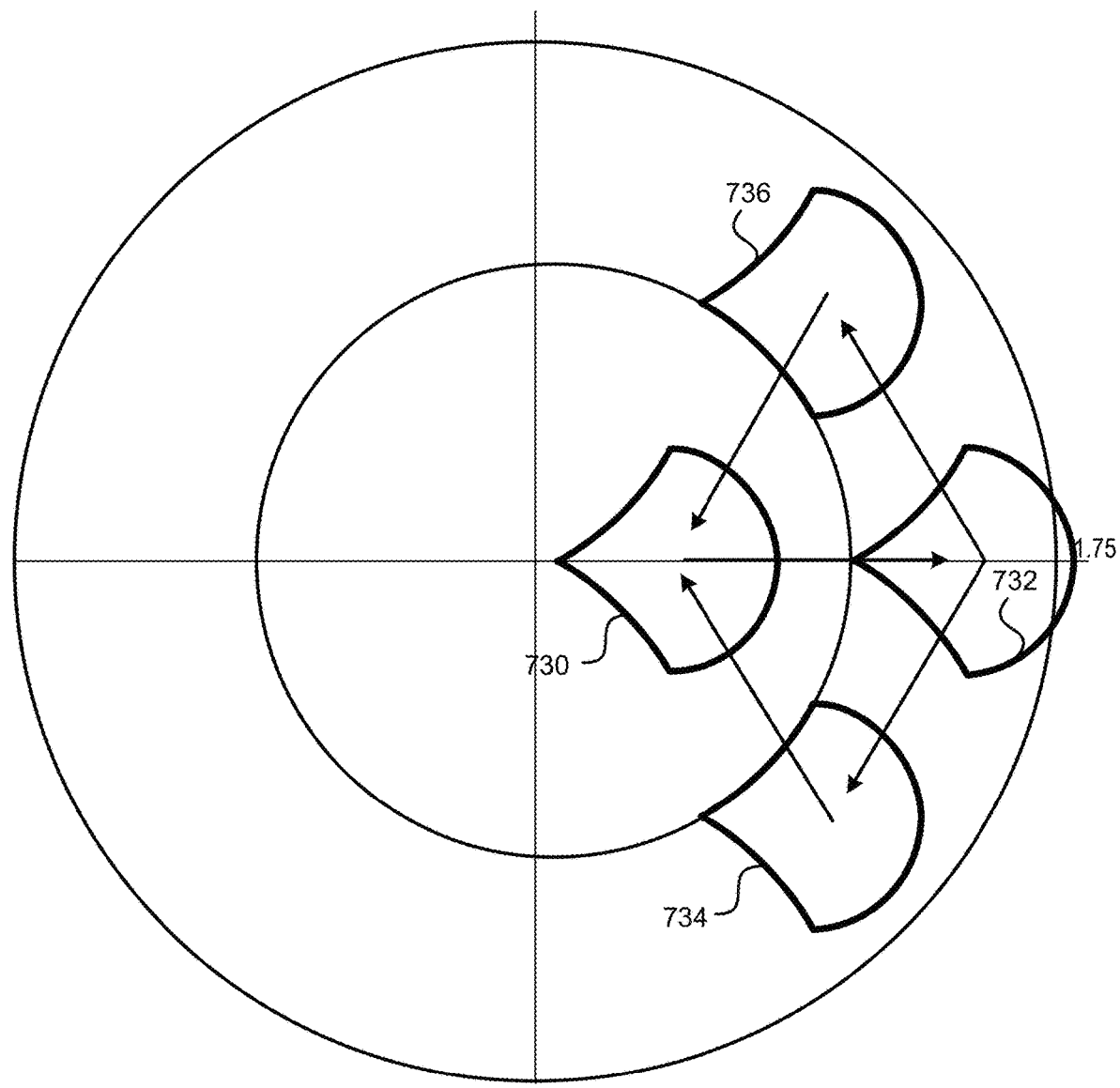
FIG. 7C is a simplified k-space diagram illustrating operation of the single projector element illustrated in FIG. 7B.

FIG. 7B is a simplified plan view diagram illustrating a single projector element of the six-projector waveguide display illustrated in FIG. 7A. FIG. 7C is a simplified k-space diagram illustrating operation of the single projector element illustrated in FIG. 7B. Referring to FIGS. 7B and 7C, light diffraction and accompanying translation of the field of view in k-space can be described. As illustrated in FIG. 7B, a portion of light diffracted from ICG 710 can be represented by light ray 740 as light propagates into region 712. Diffraction from gratings in region 712 will result in generation of light ray 741 directed toward the top half of the waveguide, i.e., region 719. This can be considered as an OPE event.

After propagating into the top half of the waveguide, i.e., region 719, diffraction from gratings in region 719 will result in generation of output light ray 742 propagating down toward the user, representing light in the upper portion of the user's field of view.

Similarly, light in the lower portion of the user's field of view will be produced as light ray 750 propagates into the top half of the waveguide, i.e., region 719, after diffraction from ICG 710. Diffraction from gratings into the top half of the waveguide, i.e., region 719, will result in the generation of light ray 751 (an OPE event), which propagates into the lower half of the waveguide, i.e., region 712. Diffraction as an EPE event in region 712 will result in the generation of output light ray 752 propagating up toward the user.

It should be noted that although the shared eyepiece waveguide region illustrated in FIGS. 7A and 7B only includes overlap between adjacent grating vectors in the central region at which the grating lines overlap. In other embodiments, the overlap region can extend closer to each of the respective ICGs. These designs with increased overlap enable performance in which, if the user's pupil moves in the eyebox to a position off-center from the center of the eyebox, the visibility of the field of view is more tolerant to this deviation of the user's pupil from a well-centered pupil location, which may result from a change in the user's gaze.

Referring to FIG. 7C, diffraction from the ICG 710 corresponds to translation of field of view 730 to position 732. Diffraction from gratings in region 719 (OPE event) represented by light ray 751 results in translation of the field of view to position 734 and diffraction in region 712 (EPE event) results in translation of the field of view to the eye-space region of the k-space diagram.

Similarly, diffraction from gratings in region 712 (OPE event) represented by light ray 741 results in translation of the field of view to position 736 and diffraction in region 719 (EPE event) results in translation of the field of view to the eye-space region of the k-space diagram.

The k-space diagram in FIG. 7C demonstrates that the eyepiece waveguide design illustrated in FIG. 7B utilizes gratings with a decreased grating period along axis 701 since the center of field of view 730 is translated along axis 701 by a distance that is less than the distance from the origin to the annulus of in-waveguide angles.

Figure 7D:
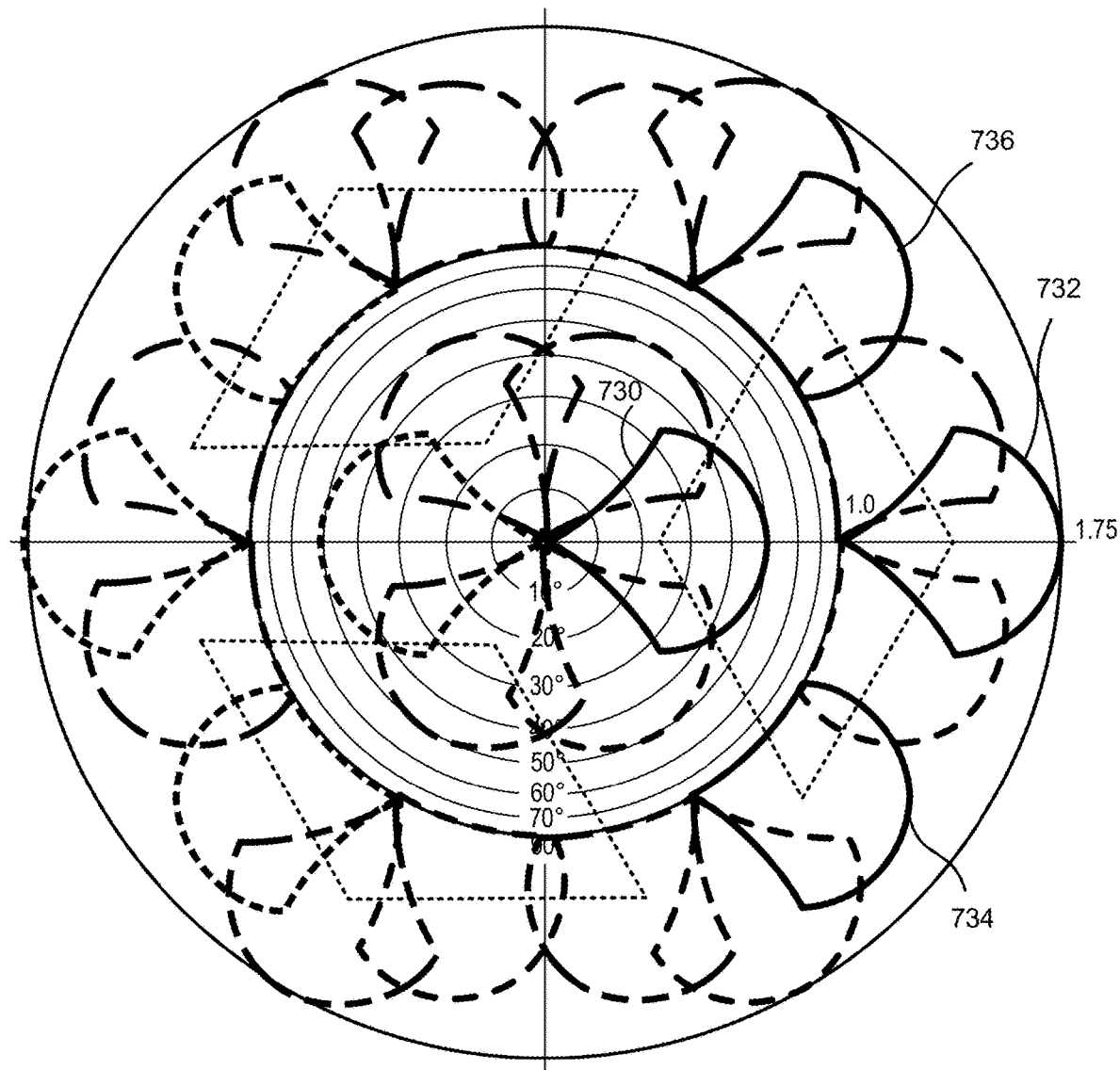
FIG. 7D is a simplified k-space diagram illustrating operation of the six-projector waveguide display illustrated in FIG. 7A.

FIG. 7D is a simplified k-space diagram illustrating operation of the six-projector waveguide display illustrated in FIG. 7A. When the analysis performed for the portion of the six-projector waveguide display that is illustrated in FIG. 7B is extended to the five other projectors, a combined field of view including six partially overlapping fields of view is produced as shown in FIG. 7D. This combined field of view is formed by tiling individual fields of view that are a generally cone-shaped sector with a circular termination results in a combined field of view that is circular and characterized by a combined, conical field of view of ~100° in a polymer eyepiece having an index of refraction of ~1.75.

Figure 8:
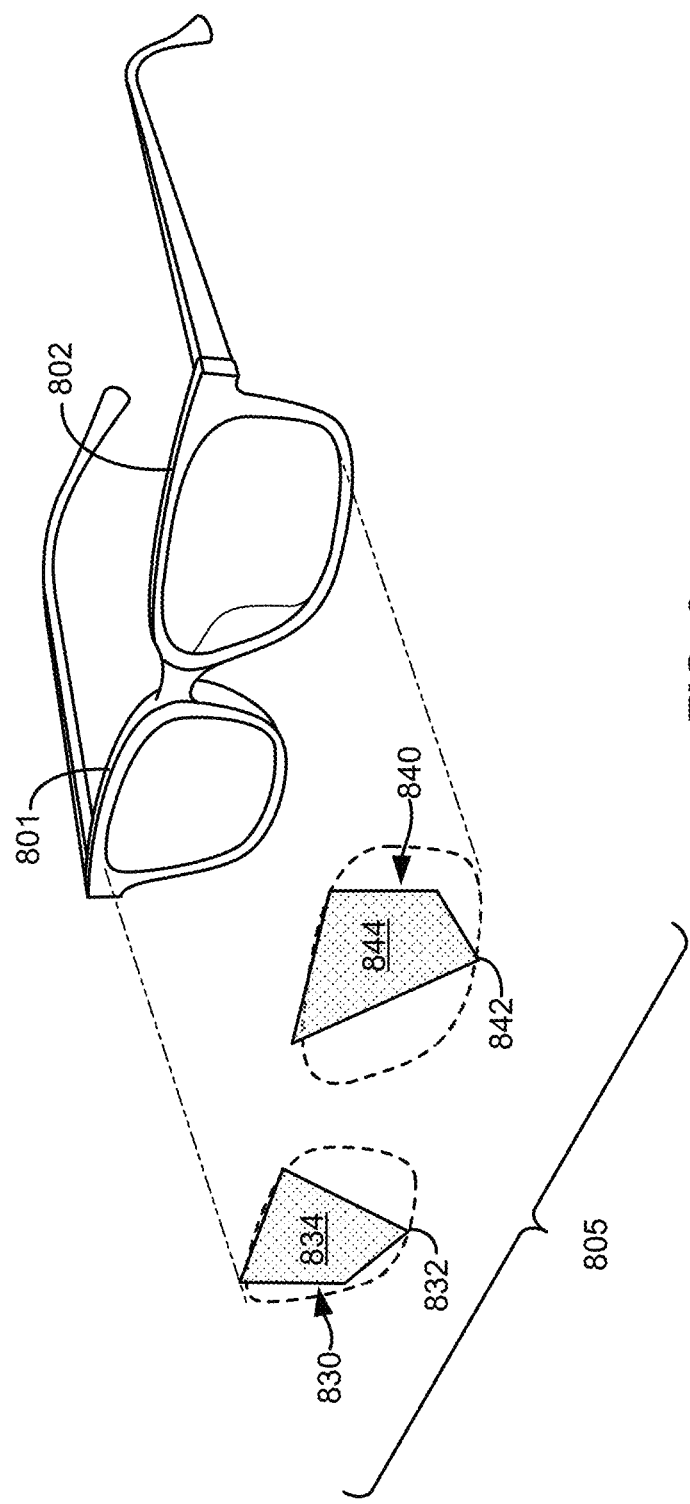
FIG. 8 is a simplified schematic diagram illustrating integration of glasses and one or more eyepiece waveguides according to embodiments of the present invention

FIG. 8 is a simplified perspective drawing illustrating integration of glasses and one or more eyepiece waveguides according to embodiments of the present invention. As illustrated in FIG. 8, eyepiece waveguides can be integrated into the right lens frame 801 and the left lens frame 802 of a pair of glasses. The integration of a first eyepiece waveguide 830 in right lens frame 801 and a second eyepiece waveguide 840 in left lens frame 802 enables a wide field of view as a result of the functionality of eyepiece waveguides described herein. As illustrated in FIG. 8, first waveguide display 805 utilizes two eyepiece waveguides 830 and 840, which each include ICG 832/842, and CPE 834/844.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of operating an eyepiece waveguide having a first region and a second region, the method comprising:
    directing light from a first projector to impinge on a first incoupling grating (ICG);
    diffracting a fraction of the light from the first projector into a first portion of the first region of the eyepiece waveguide, into a first portion of the second region, into a second portion of the second region, and out of the eyepiece waveguide;

diffracting another fraction of the light from the first projector into a second portion of the first region of the eyepiece waveguide, into a second portion of the second region, into the first portion of the second region, and out of the eyepiece waveguide;

directing light from a second projector to impinge on a second ICG;

diffracting a fraction of the light from the second projector into the first portion of the second region of the eyepiece waveguide, into the first portion of the first region, into the second portion of the first region, and out of the eyepiece waveguide; and diffracting another fraction of the light from the second projector into the second portion of the second region of the eyepiece waveguide, into the second portion of the first region, into the first portion of the first region, and out of the eyepiece waveguide.

2. The method of claim 1 wherein:

the first region includes:
 a first set of diffractive optical elements disposed in the first portion of the first region and oriented at a positive angle with respect to an axis; and
 a second set of diffractive optical elements disposed in the second portion of the first region and oriented at a negative angle with respect to the axis; and the second region includes:
 a third set of diffractive optical elements disposed in the first portion of the second region and oriented at 180° plus the negative angle with respect to the axis; and
 a fourth set of diffractive optical elements disposed in the second portion of the second region and oriented at 180° minus the positive angle with respect to the axis.

3. The method of claim 2 wherein the first set of diffractive optical elements comprises a first set of gratings and the second set of diffractive optical elements comprises a second set of gratings, wherein the first set of gratings and the second set of gratings are blazed and characterized by decreased outcoupling efficiency for light from the first projector.

4. The method of claim 2 wherein the third set of diffractive optical elements comprises a third set of gratings and the fourth set of diffractive optical elements comprises a fourth set of gratings, wherein the third set of gratings and the fourth set of gratings are blazed and characterized by decreased outcoupling efficiency for light from the second projector.

5. The method of claim 2 wherein the positive angle is ~30° and the negative angle is ~−30°.

6. The method of claim 1 wherein the first region and the second region form an overlap region.

7. The method of claim 6 wherein the overlap region is disposed at a midpoint between the first ICG and the second ICG.

8. The method of claim 1 wherein:
the light from the first projector impinges on the first ICG at a first non-zero angle of incidence; and
the light from the second projector impinges on the second ICG at a second non-zero angle of incidence equal to zero minus the first non-zero angle of incidence.

9. The method of claim 8 wherein:
a first field of view of the first portion of the second region is centered at the first non-zero angle of incidence; and
a second field of view of the first portion of the first region is centered at the second non-zero angle of incidence.

10. The method of claim 1 wherein:
the eyepiece waveguide has a first surface and a second surface opposing the first surface; and
the first ICG is formed on or in the first surface or the second surface.

11. The method of claim 1 wherein:
the eyepiece waveguide has a first surface and a second surface opposing the first surface; and
the second ICG is formed on or in the first surface or the second surface.

12. The method of claim 1 further comprising forming a first field of view using light from the first projector that is diffracted out of the eyepiece waveguide.

13. The method of claim 12 further comprising forming a second field of view using light from the second projector that is diffracted out of the eyepiece waveguide.

14. The method of claim 13 wherein:
the first field of view is centered at a non-normal angle of incidence; and
the second field of view is centered at zero minus the non-normal angle of incidence.

15. The method of claim 13 wherein the first field of view and the second field of view form a combined field of view.

16. The method of claim 13 wherein the first field of view and the second field of view are tiled.

17. The method of claim 13 wherein a portion of the first field of view overlaps with a portion of the second field of view.

* * * * *